US012704611B2

(12) United States Patent
Mao

(10) Patent No.: US 12,704,611 B2
(45) Date of Patent: Aug. 11, 2026

(54) RANGING METHOD AND DEVICE, STORAGE MEDIUM, AND LiDAR

(71) Applicant: SUTENG INNOVATION TECHNOLOGY CO., LTD., Shenzhen (CN)

(72) Inventor: Mingming Mao, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 874 days.

(21) Appl. No.: 18/090,573

(22) Filed: Dec. 29, 2022

(65) Prior Publication Data

US 2023/0204741 A1 Jun. 29, 2023

(30) Foreign Application Priority Data

Dec. 29, 2021 (CN) ........................ 202111646983.2

(51) Int. Cl.
*G01S 7/497* (2006.01)
*G01S 17/06* (2006.01)

(52) U.S. Cl.
CPC .............. *G01S 7/497* (2013.01); *G01S 17/06* (2013.01)

(58) Field of Classification Search
CPC ...... G01S 7/4802; G01S 7/484; G01S 7/4868; G01S 7/497; G01S 17/89; G01S 17/06; G01S 17/10; G01S 17/42; G01S 17/4804; G01S 17/4815
USPC .......................................................... 356/4.1
See application file for complete search history.

(56) References Cited

U.S. PATENT DOCUMENTS

| | | | | |
|---|---|---|---|---|
| 11,703,569 | B2 * | 7/2023 | Hall | G01S 7/4811 356/5.03 |
| 12,399,279 | B1 * | 8/2025 | Yavid | G01S 17/931 |
| 2018/0284241 | A1 * | 10/2018 | Campbell | G01S 7/4868 |
| 2019/0277703 | A1 * | 9/2019 | Valouch | G01J 5/20 |

(Continued)

FOREIGN PATENT DOCUMENTS

| | | | | |
|---|---|---|---|---|
| CA | 3125716 | A1 * | 10/2021 | G02B 27/0081 |
| CA | 3040683 | C * | 10/2023 | G01S 17/931 |

(Continued)

OTHER PUBLICATIONS

Warren, "Automotive LIDAR Technology," 2019 Symposium on VLSI Circuits, Kyoto, Japan, 2019, pp. C254-C255, doi: 10.23919/VLSIC.2019.8777993. (https://ieeexplore.ieee.org/document/8777993) (Year: 2019).*

(Continued)

*Primary Examiner* — Atul Trivedi
(74) *Attorney, Agent, or Firm* — BAYES PLLC

(57) ABSTRACT

This application discloses a ranging method and device, a storage medium, and a LiDAR. The method includes: determining an edge field of view and a central field of view; acquiring a light emission power for the edge field of view and a light emission power for the central field of view; compensating the light emission power for the edge field of view based on a difference between the light emission power for the edge field of view and the light emission power for the central field of view, and detecting a target object based on the light emission power for the central field of view and the compensated light emission power for the edge field of view.

9 Claims, 16 Drawing Sheets

Entire field of view of one emitting array

Edge field of view

Central field of view

Edge field of view

(56) References Cited

U.S. PATENT DOCUMENTS

| | | | | |
|---|---|---|---|---|
| 2020/0225330 | A1* | 7/2020 | Zhang | G01S 17/10 |
| 2020/0284883 | A1* | 9/2020 | Ferreira | G01S 7/4815 |
| 2020/0301011 | A1* | 9/2020 | Niinami | G01S 7/4915 |
| 2020/0400788 | A1* | 12/2020 | Van Lierop | G01S 7/4817 |
| 2021/0080550 | A1* | 3/2021 | Gassend | G01S 7/4817 |
| 2021/0109203 | A1* | 4/2021 | Boehlau | G01S 17/10 |
| 2021/0124018 | A1* | 4/2021 | Gassend | G01S 7/481 |
| 2021/0132229 | A1* | 5/2021 | Milkov | G01S 7/4863 |
| 2021/0293931 | A1* | 9/2021 | Nemet | G01S 7/4813 |
| 2021/0305777 | A1* | 9/2021 | Lee | H01S 5/0651 |
| 2022/0187471 | A1* | 6/2022 | Eshel | G01S 17/89 |
| 2022/0334253 | A1* | 10/2022 | Al Abbas | G01S 17/18 |

FOREIGN PATENT DOCUMENTS

| | | | | | |
|---|---|---|---|---|---|
| CN | 112243120 | A | | 1/2021 | |
| CN | 112639516 | A | | 4/2021 | |
| EP | 4206740 | B1 | * | 6/2025 | G06V 20/56 |
| KR | 20210045457 | A | * | 4/2021 | G01S 17/89 |
| KR | 20250067832 | A | * | 5/2025 | F41G 1/14 |
| WO | WO-2019106429 | A2 | * | 6/2019 | G01S 17/89 |
| WO | WO-2019197894 | A1 | * | 10/2019 | G01S 7/4868 |
| WO | WO-2020020609 | A1 | * | 1/2020 | G02B 26/0875 |
| WO | WO-2020243038 | A1 | * | 12/2020 | G01S 17/89 |
| WO | WO-2021013717 | A1 | * | 1/2021 | G01S 17/08 |
| WO | WO-2021019308 | A1 | * | 2/2021 | G01B 11/22 |
| WO | WO-2021026241 | A1 | * | 2/2021 | G01S 17/894 |
| WO | WO-2021050233 | A1 | * | 3/2021 | G01S 17/42 |
| WO | WO-2021139919 | A1 | * | 7/2021 | G01S 7/4863 |
| WO | WO-2022032124 | A1 | * | 2/2022 | G01S 7/4815 |
| WO | WO-2022053874 | A2 | * | 3/2022 | G01S 7/484 |
| WO | WO-2022180449 | A1 | * | 9/2022 | G01S 17/89 |
| WO | WO-2026009226 | A1 | * | 1/2026 | G01S 7/4813 |

OTHER PUBLICATIONS

European Search Report issued in corresponding European Application No. 22217102.7, mailed May 4, 2023, 10 pages.

First Office Action issued in related Chinese Application No. 202111646983.2, mailed Sep. 8, 2023, 12 pages.

* cited by examiner

RANGING METHOD AND DEVICE, STORAGE MEDIUM, AND LiDAR

CROSS-REFERENCE TO RELATED APPLICATION

The present application claims the benefit of priority to China Patent Application No. CN 202111646983.2, filed on Dec. 29, 2021, the content of which is incorporated herein by reference in its entirety.

TECHNICAL FIELD

This application relates to the technical field of computers, and in particular, to a ranging method and device, a storage medium, and a LiDAR.

TECHNICAL BACKGROUND

For a LiDAR, due to lens features, the illuminance in an edge field of view is lower than the illuminance in a central field of view in an illuminated field of view. The larger a detecting angle of view, the lower the illuminance in the edge field of view. In addition, to improve the imaging quality of the edge field of view, it is necessary to set light vignetting for the edge field of view, which aggravates illuminance decline in the edge field of view.

SUMMARY

An embodiment of this application provides a ranging method and device, a storage medium, and a LiDAR, to ensure that illuminance in an edge field of view is consistent with illuminance in a central field of view, thereby ensuring that a ranging distance of the edge field of view is consistent with a ranging distance of the central field of view.

In a first aspect, embodiments of this application provide a ranging method, including:

- determining an edge field of view and a central field of view;
- acquiring a light emission power for the edge field of view and a light emission power for the central field of view;
- compensating the light emission power for the edge field of view based on a difference between the light emission power for the edge field of view and the light emission power for the central field of view; and
- detecting a target object based on the light emission power for the central field of view and the compensated light emission power for the edge field of view.

In a second aspect, embodiments of this application provide a ranging device, including:

- a field-of-view determining module, configured to determine an edge field of view and a central field of view;
- a power acquiring module, configured to acquire a light emission power for the edge field of view and a light emission power for the central field of view;
- a power compensating module, configured to compensate the light emission power for the edge field of view based on a difference between the light emission power for the edge field of view and the light emission power for the central field of view; and
- a ranging module, configured to detect a target object based on the light emission power for the central field of view and the compensated light emission power for the edge field of view.

In a third aspect, embodiments of this application provide a computer storage medium. The computer storage medium is stored with a plurality of instructions. The instructions are capable of being loaded by a processor to perform the steps of the method described above.

In a fourth aspect, embodiments of this application provide a LiDAR, which can include a processor and a storage.

The storage stores a computer program. The computer program is capable of being loaded by a processor to perform the steps of the method described above.

The beneficial effects of the technical solutions include at least the following.

The edge field of view and the central field of view are determined. The light emission power for the edge field of view and the light emission power for the central field of view are acquired. The light emission power for the edge field of view is compensated based on the difference between the light emission power for the edge field of view and the light emission power for the central field of view. The target object is detected based on the light emission power for the central field of view and the compensated light emission power for the edge field of view. Therefore, the illuminance of the edge field of view can be consistent with the illuminance of the central field of view, thereby ensuring that a ranging distance of the edge field of view is consistent with a ranging distance of the central field of view.

BRIEF DESCRIPTION OF THE DRAWINGS

To explain embodiments of this application or the technical solutions in the prior art more clearly, the following briefly introduces the drawings in the embodiments or the prior art. The drawings in the following description are only some embodiments of this application. The person skilled in the art may obtain other drawings based on these drawings without creative labor.

DETAILED DESCRIPTION

To make objectives, technical solutions, and advantages of this application clearer, embodiments of this application are described in detail below with reference to the drawings.

When the following description refers to the drawings, unless otherwise indicated, the same numbers in different drawings indicate the same or similar elements. The implementations described in the following exemplary embodiments do not represent all implementations consistent with this application. On the contrary, the implementations are merely examples of devices and methods consistent with some aspects of this application as detailed in the appended claims.

In the description of this application, it shall be understood that the terms such as "first" and "second" are merely intended for a purpose of description, and shall not be understood as an indication or implication of relative importance. The person skilled in the art can understand specific meanings of the foregoing terms in this application to a specific situation. In addition, in the description of this application, "a plurality of" means two or more unless otherwise stated. "And/or" is an association relationship describing related objects, indicating that there can be three relationships. For example, A and/or B can mean that there are three situations: A alone, A and B at the same time, and B alone. A character "/" generally indicates that the related objects are in an "or" relationship.

A ranging method provided in this embodiment of this application is described in detail with reference to FIG. 1 to FIG. 12. This method can be realized by a computer program, and can be operated on a ranging device based on the Von Neumann system. The computer program can be integrated into applications or operated as an independent tool application. The ranging device in embodiments of this application can be any apparatus adopting the ranging method, including but not limited to: a vehicle-mounted apparatus, an aircraft, a train, a handheld apparatus, a wearable apparatus, a computing apparatus, or other processing apparatuses connected to a wireless modem.

Figure 1:
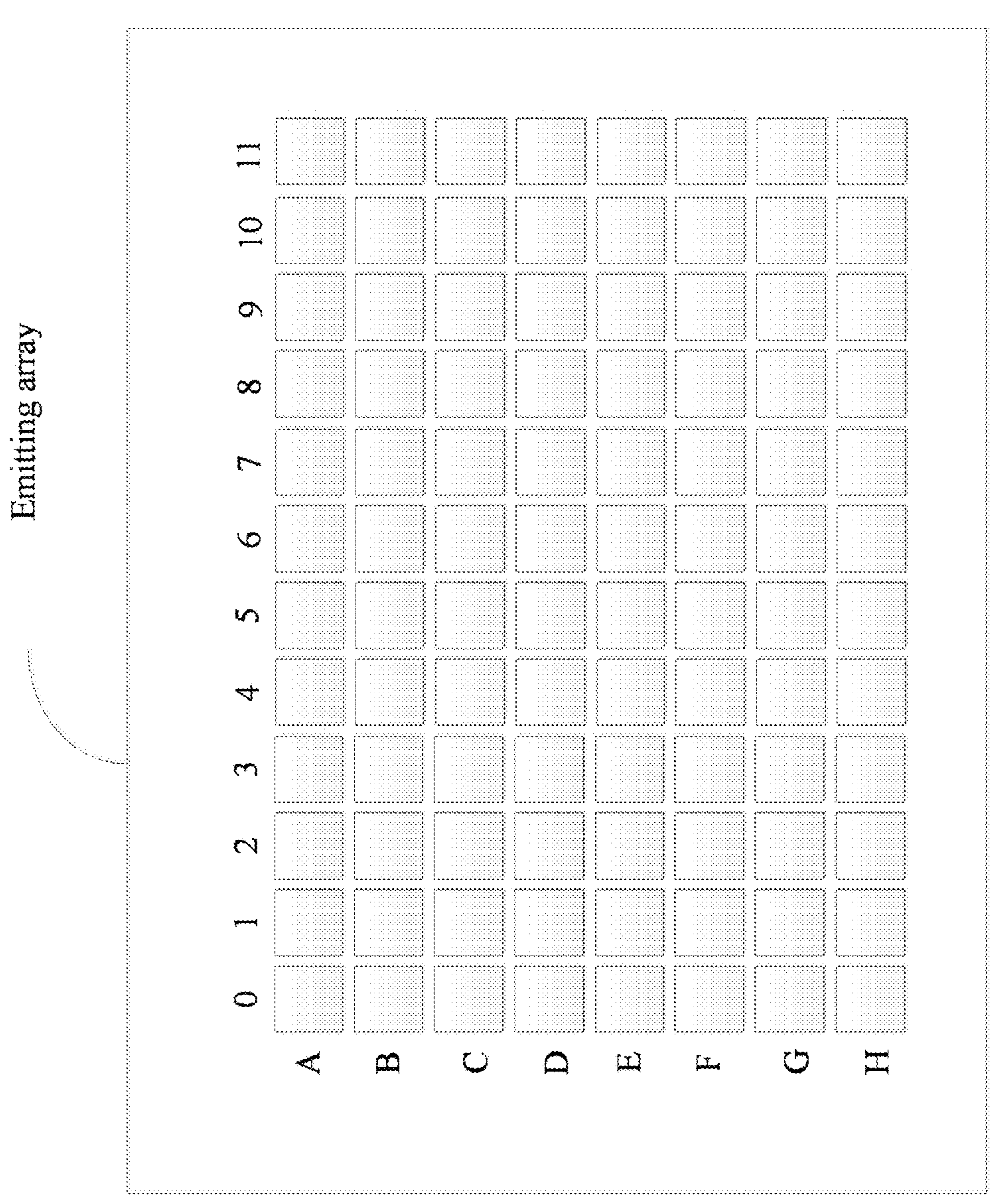
FIG. 1 is an exemplary schematic diagram of an emitting array according to an embodiment of this application.
Figure 2:
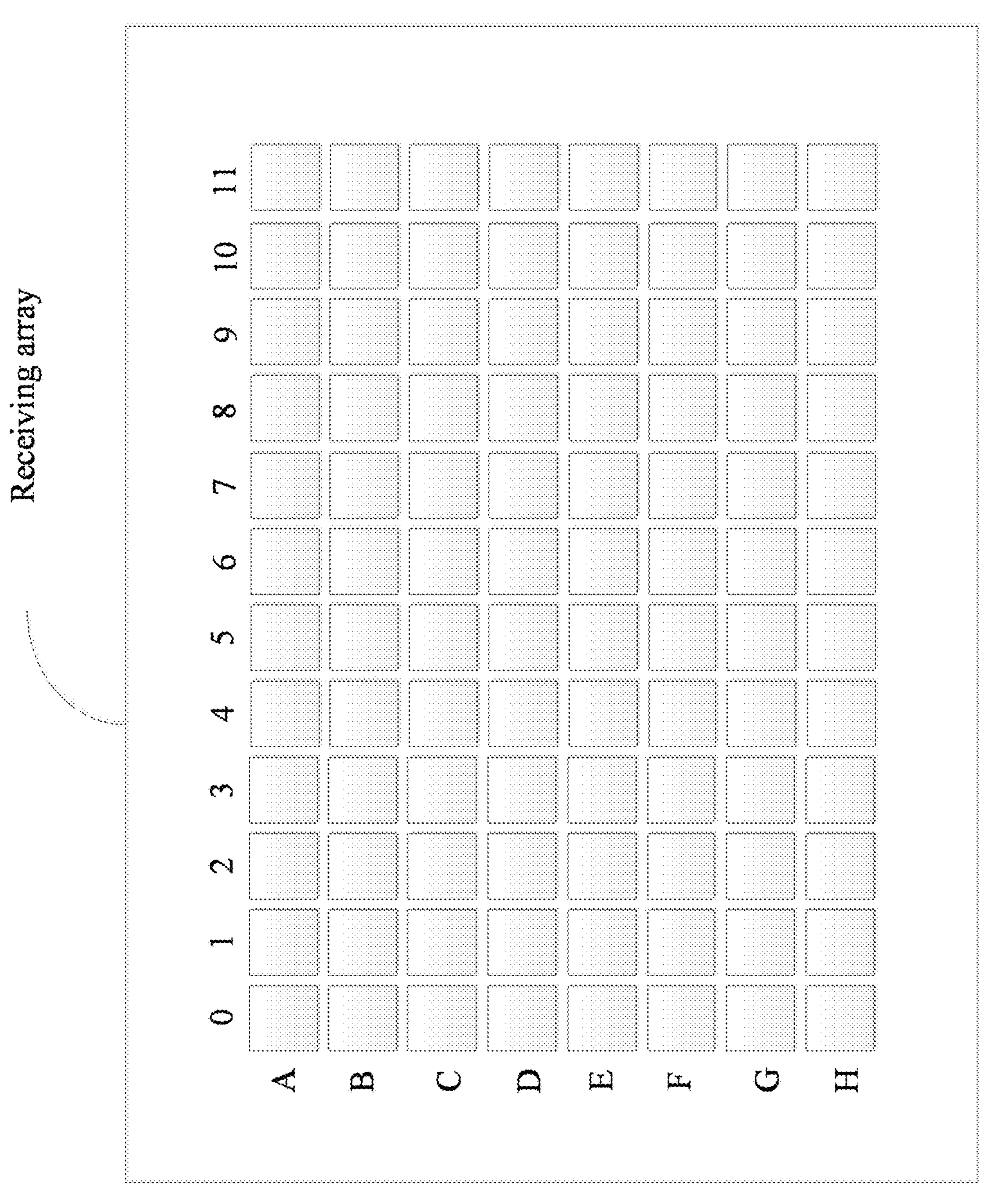
FIG. 2 is an exemplary schematic diagram of a receiving array according to an embodiment of this application.
Figure 3:
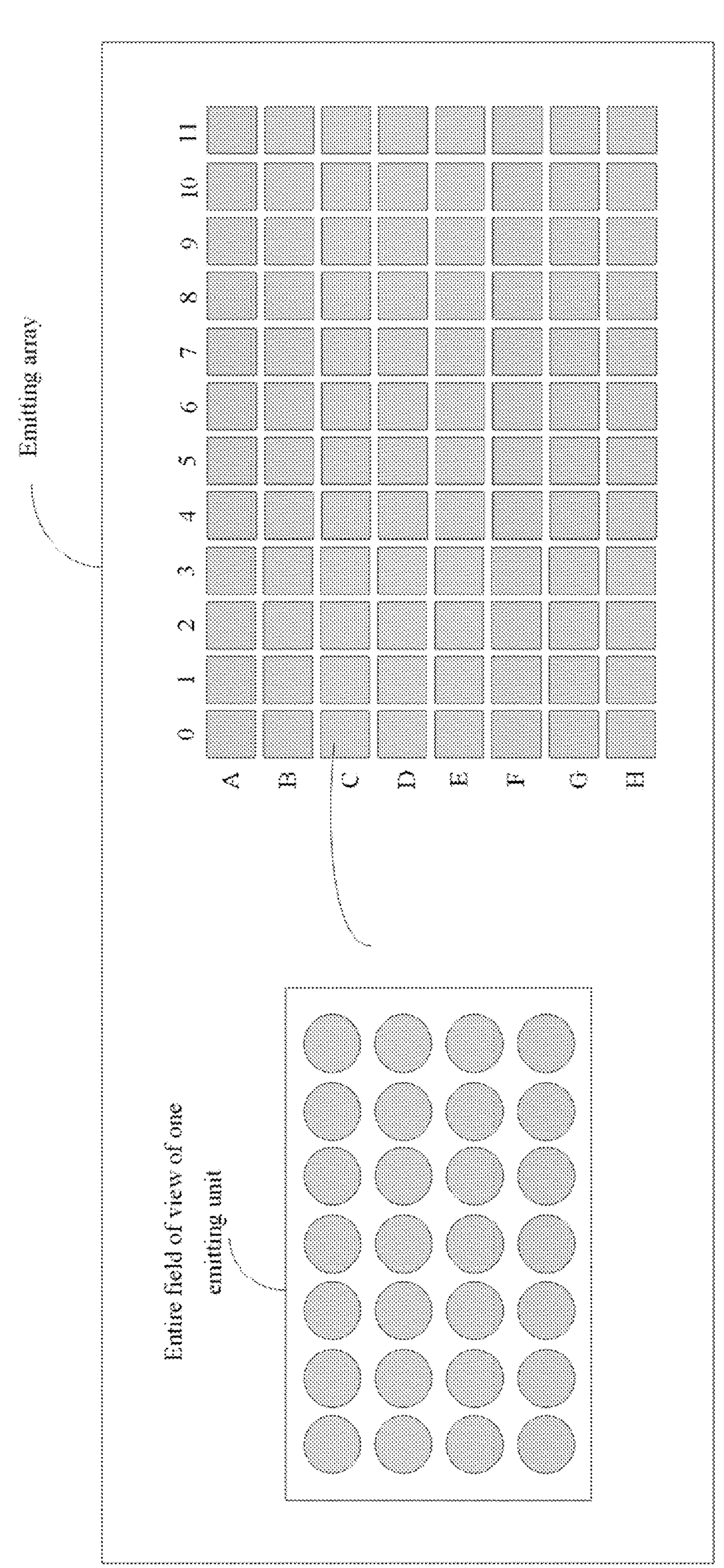
FIG. 3 is an exemplary schematic diagram of an emitting unit according to an embodiment of this application.

A LiDAR includes an emitting module and a receiving module. The emitting module includes emitting units. The receiving module includes receiving units with high sensitivity. The LiDAR can include an emitting array. FIG. 1 is an exemplary schematic diagram of an emitting array. One emitting array can include 8×12 emitting units. The LiDAR can include a receiving array. FIG. 2 is an exemplary schematic diagram of one receiving array. One receiving array can include 8×12 receiving units. As an example, the emitting unit and the receiving unit are in one-to-one correspondence. The emitting principle of the LiDAR is as follows: the emitting units emit laser beams to a measured object, the receiving units corresponding to the emitting units receive echo signals generated by the emitted laser beams to realize the detection of the object. The LiDAR can be a mechanical LiDAR or a solid-state LiDAR. This application does not limit the type of the LiDAR. Each emitting unit can include one laser or a group of lasers. This application does not limit the number of lasers included in each emitting unit. FIG. 3 shows an entire field-of-view diagram when one emitting unit includes a plurality of lasers.

According to the cosine fourth fall off law, the illuminance of the entire field of view is reduced in proportion to the fourth power of the cosine of an incident angle $\theta$. Therefore, the larger the angle of view, the lower illuminance of an edge field of view in the entire field of view. To ensure the imaging quality of a field of view at the edge, a vignetting effect is designed for a laser beam corresponding to the field of view at the edge, which causes a vignetting phenomenon. That is, the farther away from a central axis, the smaller the effective aperture of an emitted laser beam passing through an optical system. Therefore, the farther away from the central axis, the weaker the intensity of the laser beam. The formed image is vignetted away from the central axis, which further reduces the illuminance of a field of view at the edge. Therefore, there is a difference between the illuminance in the field of view at the edge and the illuminance in the field of view at the central, so that a ranging distance of the field of view at the edge is inconsistent with a ranging distance of the field of view at the central. That is, the ranging distance of the central field of view is faulty. For example, for a target object with 30 m, 100 klux, and 10% reflectivity, the ranging distance of the field of view at the edge deviates by 16% or more from the ranging distance of the field of view at the central. This application provides a ranging method to solve the problem that the illuminance of the edge field of view is inconsistent with the illuminance of the central field of view due to the decrease in illuminance at the edge.

Figure 4:
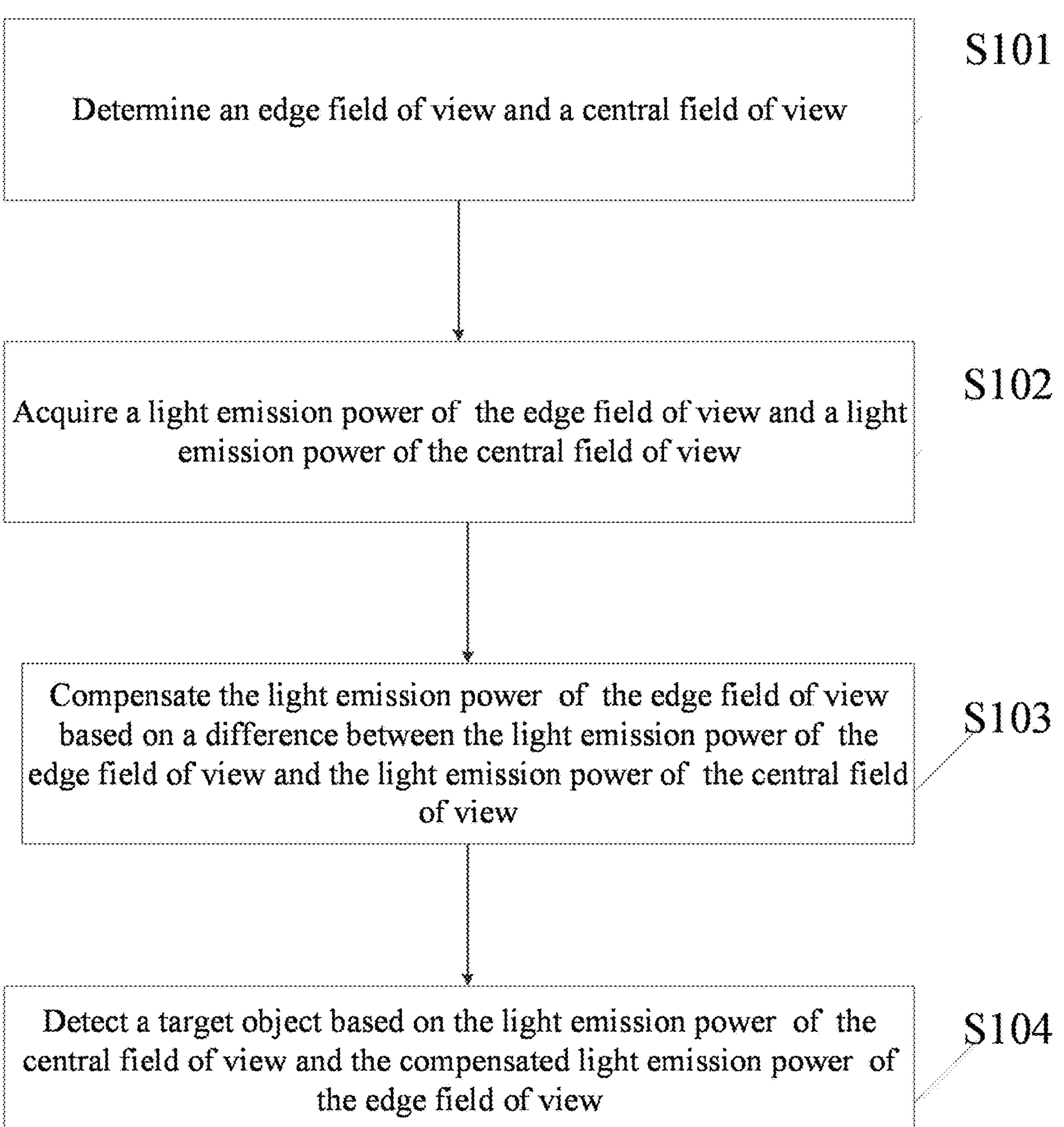
FIG. 4 is a flowchart of a ranging method according to an embodiment of this application.

FIG. 4 is a flowchart of a ranging method according to an embodiment of this application.

As shown in FIG. 4, the method in this embodiment of this application may include following steps.

S101. Determine an edge field of view and a central field of view.

It is understandable that the delimitation between the edge field of view and the central field of view is related to LiDAR design parameters. As an example, when the central field of view accounts for 50% of an entire detecting field of view. That is, in a case that a horizontal detecting angle of view is 120 degrees, the field of view of the middle 60 degrees is a central field of view in the horizontal direction. The vertical direction is similar. That is, in a case that a vertical detecting angle of view is 40 degrees, the field of view of the middle 20 degrees is a central field of view in the vertical direction.

Figure 5:
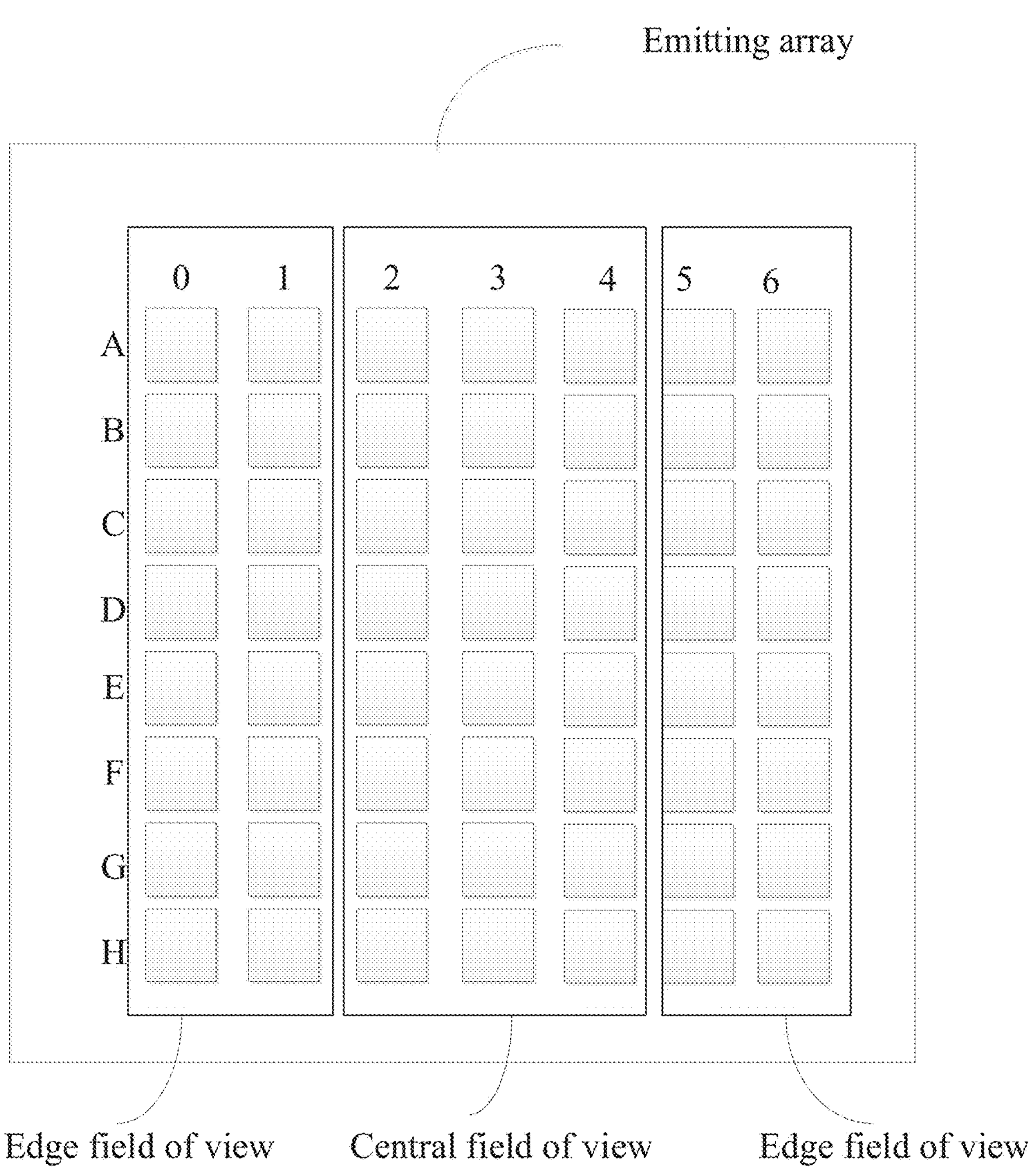
FIG. 5 is an exemplary schematic diagram of an emitting array according to an embodiment of this application.

The edge field of view can be a field of view at an edge position of an emitting array. One edge field of view of the emitting array can be a plurality of symmetrical fields of view. FIG. 5 is an exemplary schematic diagram of a central field of view and an edge field of view in an emitting array. In one emitting array, according to a horizontal angle of view of the emitting array, a field of view corresponding to columns 0 and 1 on the left side and a field of view corresponding to columns 5 and 6 on the right side of the emitting array are categorized as the edge field of view. Fields of view corresponding to emitting units in columns 2, 3, and 4 at the center are categorized as the central field of view.

Figure 6:
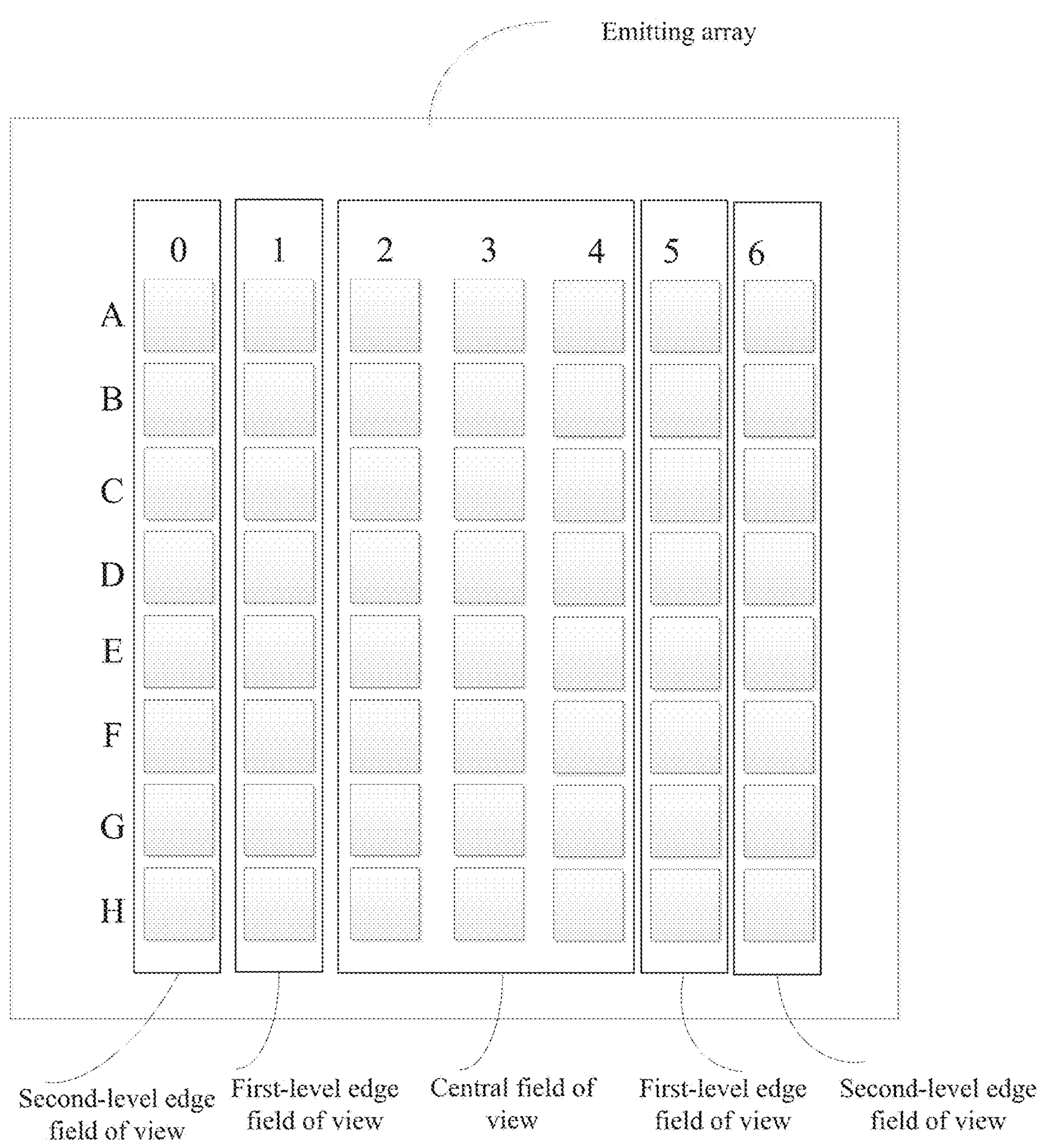
FIG. 6 is an exemplary schematic diagram of an emitting array according to an embodiment of this application.

In the same emitting array, when there are a plurality of edge fields of view, the edge fields of view can be partitioned according to a difference between the angle of view corresponding to the edge field of view and the central angle of view. The edge fields of view can be hierarchically partitioned according to the difference between the angle of view corresponding to the edge field of view and the central angle of view. For example, an edge field of view whose absolute value of a difference between the angle of view corresponding to the edge field of view and the angle of view corresponding to the central field of view is in a first numerical range can be defined as a first-level edge field of view. An edge field of view whose absolute value of the difference between the angle of view corresponding to the edge field of view and the angle of view corresponding to the central field of view is in a second numerical range can be defined as a second-level edge field of view. FIG. 6 is a schematic diagram of the edge field of view in one emitting array according to a difference of a horizontal angle of view in the emitting array. The field of view corresponding to left and right sides of the emitting array is categorized as the edge field of view. The field of view corresponding to the center is categorized as the central field of view. The edge field of view is then partitioned as the first-level edge field of view and the second-level edge field of view.

Figure 7:
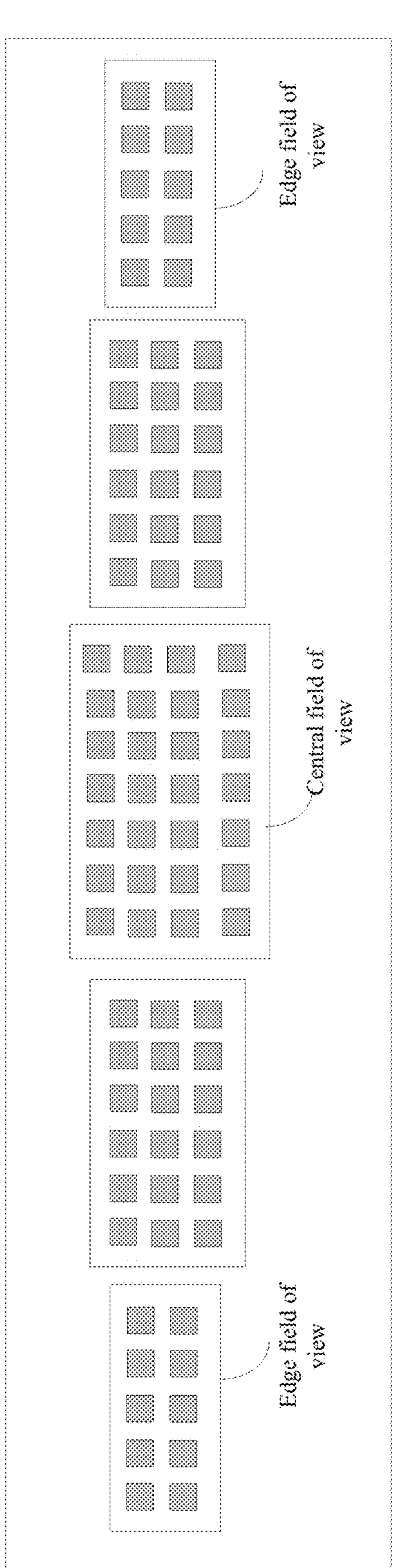
FIG. 7 is an exemplary schematic diagram of an emitting array according to an embodiment of this application.
Figure 8:
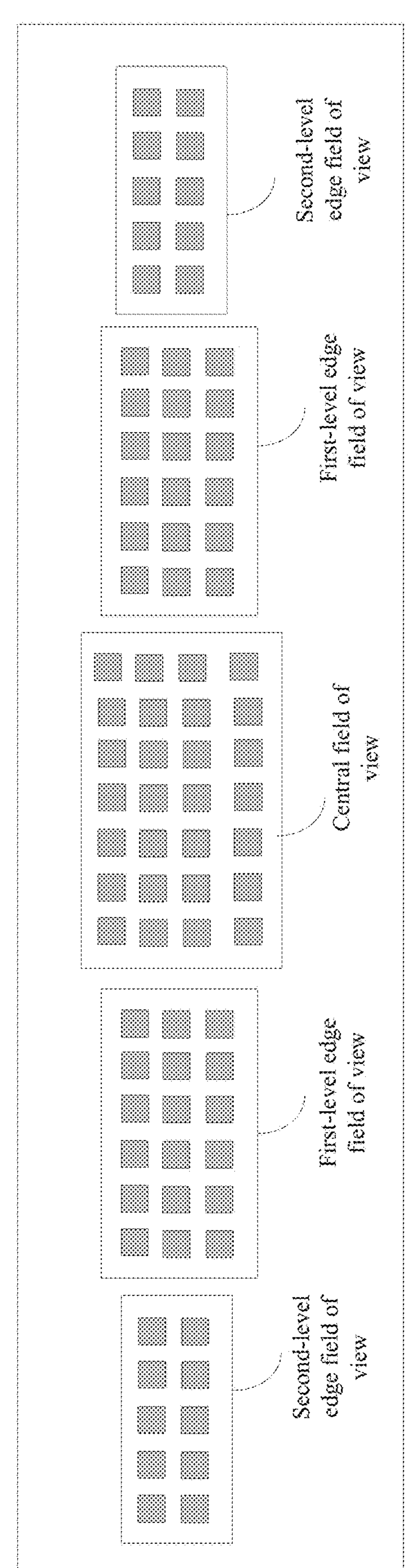
FIG. 8 is an exemplary schematic diagram of an emitting array according to an embodiment of this application.

If one emitting entire field of view contains a plurality of emitting arrays, as shown in FIG. 7, the field of view corresponding to the emitting array at the center is the central field of view. The field of view corresponding to the leftmost or rightmost emitting array is the edge field of view. In some embodiments, after categorizing the fields of view on the left side and right side of the central field of view as the edge field of view, the edge fields of view is partitioned according to the absolute value of the difference between the angle of view corresponding to each group of the emitting arrays of the edge field of view and the angle of view corresponding to the central field of view. FIG. 8 is a schematic diagram of the entire field of view of a plurality of emitting arrays. The edge fields of view on the left and right sides of the central field of view are categorized into the first-level edge field of view and the second-level edge field of view.

The edge field of view and the central field of view can be artificially divided according to the corresponding illuminance in the plurality of fields of view. The field of view with low illuminance is categorized as the edge field of view. The field of view with near ideal illuminance is categorized as the central field of view. The hierarchical strategy mentioned above can also be adopted according to the difference between the illuminance corresponding to the field of view at the central and the illuminance corresponding to the field of view at the edge during the use of the LiDAR S102. Acquire a light emission power for the edge field of view and a light emission power for the central field of view.

The light emission power for the edge field of view and the light emission power for the central field of view refer to a power of a laser beam emitting from the edge field of view and the central field of view after passing through an emitting lens. The light emission power for the edge field of view and the light emission power for the central field of view are related to design parameters of a LiDAR, particularly, related to the lens features of the LiDAR and the design of the LiDAR in terms of the horizontal field of view and vertical field of view. It can be understood that the larger the vertical and horizontal fields of view of the LiDAR, the greater the difference between the light emission power for the edge field of view and the light emission power for the central field of view.

The light emission power for the edge field of view and the light emission power for the central field of view can be obtained by directly invoking data stored in Random Access Memory (RAM) calibrated in Field Programmable Gate Array (FPGA) of the LiDAR, or by detecting a detection distance of the central field of view and a detection distance of the edge field of view based on the formula $R \propto \sqrt{P}$, where R is the detection distance of the central field of view or the edge field of view, and P is the light emission power for the central field of view or the edge field of view.

S103. Compensate the light emission power for the edge field of view based on a difference between the light emission power for the edge field of view and the light emission power for the central field of view.

The greater the light emission power for the field of view, the greater the illuminance of the field of view. Therefore, based on the difference between the light emission power for the central field of view and the light emission power for the edge field of view, the light emission power for the edge field of view is increased until the light emission power corresponding to the edge field of view is consistent with the light emission power corresponding to the central field of view, so that the illuminance corresponding to the edge field of view is consistent with the illuminance of the central field of view, thus ensuring that the ranging distance of the edge field of view is consistent with the ranging distance of the central field of view. If the determined edge field of view is as shown in FIG. 5, the light emission power for the edge field of view can be compensated according to the difference between the light emission power for the edge field of view and the light emission power for the central field of view.

If the edge field of view is divided according to the angle of view corresponding to the edge field of view, it is necessary to calculate the differences between the light emission power for partitions of the edge field of view respectively and the light emission power for the central field of view, and compensate the light emission power for the edge field of view according to the differences between the light emission power for the partitions of the edge field of view respectively and the light emission power for the central field of view.

For example, if the edge field of view is partitioned as shown in FIG. 6, for the first-level edge field of view, a difference between the light emission power for the first-level edge field of view and the light emission power for the central field of view needs to be calculated. The light emission power for the first-level edge field of view is compensated according to a difference between the light emission power for the first-level edge field of view and the light emission power for the central field of view. For the second-level edge field of view, the difference between the light emission power for the second-level edge field of view and the light emission power for the central field of view needs to be calculated. The light emission power for the second-level edge field of view is compensated according to a difference between the light emission power for the second-level edge field of view and the light emission power for the central field of view.

For different levels of the edge fields of view in the same emitting unit, the light emission power for the edge field of view can be increased in the same way or in different ways. Whether the same way or different ways are used to increase the light emission power for the edge field of view, the increased light emission power can be different for different levels of the edge fields of view. For example, as shown in FIG. 6, the increased light emission power for the first-level edge field of view is less than the increased light emission power for the second-level edge field of view.

S104. Detect a target object based on the light emission power for the central field of view and the compensated light emission power for the edge field of view.

The target object is an object to be ranged by the LiDAR, and can be an arbitrary object.

When the light emission power for the edge field of view is compensated, the illuminance corresponding to the light emission power for the edge field of view is consistent with the illuminance corresponding to the light emission power for the central field of view. Therefore, when the target object is detected by adopting the light emission power for the central field of view and the compensated light emission power for the edge field of view, a distance between the LiDAR and the target object obtained by the edge field of view is consistent with a distance obtained by the central field of view.

The edge field of view and the central field of view are determined. The light emission power for the edge field of view and the light emission power for the central field of view are acquired. The light emission power for the edge field of view is compensated based on the difference between the light emission power for the edge field of view and the light emission power for the central field of view. The target object is detected based on the light emission power for the central field of view and the compensated light emission power for the edge field of view. This application can ensure that the illuminance in the edge field of view is consistent with the illuminance in the central field of view, and the ranging distance of the edge field of view is consistent with the ranging distance of the central field of view.

Figure 9:
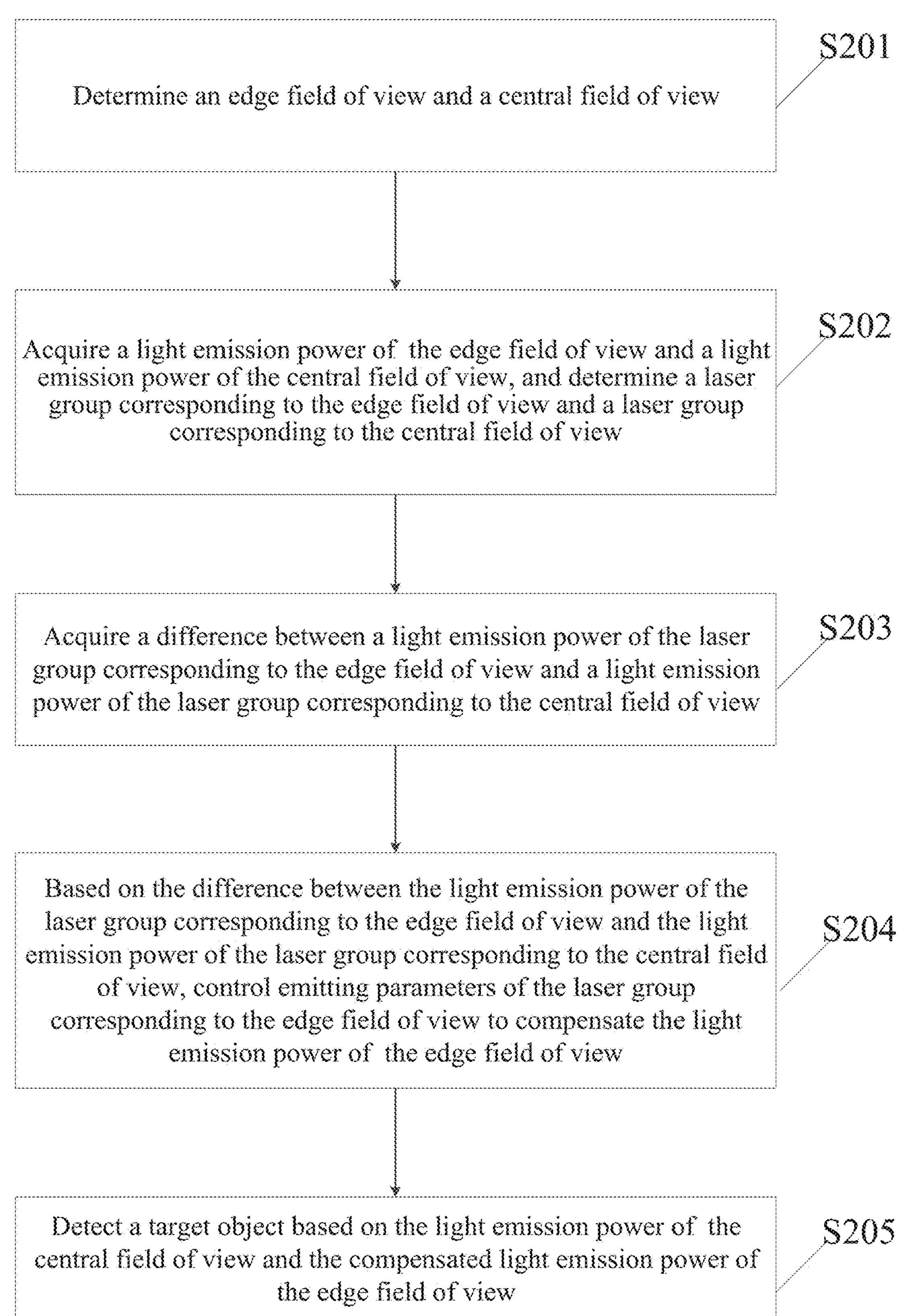
FIG. 9 is a flowchart of a ranging method according to an embodiment of this application.

FIG. 9 is a flowchart of a ranging method according to an embodiment of this application.

When the light emission power for an edge field of view is increased based on the light emission power for a central field of view, the light emission power for the edge field of view can be increased by one or more manners of increasing the number of luminous points, an emitting pulse sequence within a preset duration and an emitting power, so that the light emission power for the edge field of view is consistent with a light emission power for a central field of view. The method may include the following operations.

S201. Determine an edge field of view and a central field of view.

See S101, which is not repeated here.

S202. Acquire the light emission power for the edge field of view and the light emission power for the central field of view, and determine an emitting unit group corresponding to the edge field of view and an emitting unit group corresponding to the central field of view.

The emitting unit group is a hardware device in the LiDAR. One emitting unit group can include at least one laser and at least one laser receiver. The LiDAR can include a plurality of emitting unit groups.

See S102, which is not repeated here.

S203. Acquire a difference between a light emission power of the emitting unit group corresponding to the edge field of view and a light emission power of the emitting unit group corresponding to the central field of view.

Acquiring the light emission power for the edge field of view can bean emitting power of a laser in the emitting unit group corresponding to the edge field of view. Acquiring the light emission power for the central field of view can be acquiring an emitting power of a laser in the emitting unit group corresponding to the central field of view.

S204. Control an emitting parameter of the emitting unit group corresponding to the edge field of view to compensate the light emission power for the edge field of view based on a difference between the light emission power of the emitting unit group corresponding to the edge field of view and the light emission power of the emitting unit group corresponding to the central field of view.

Figure 10:
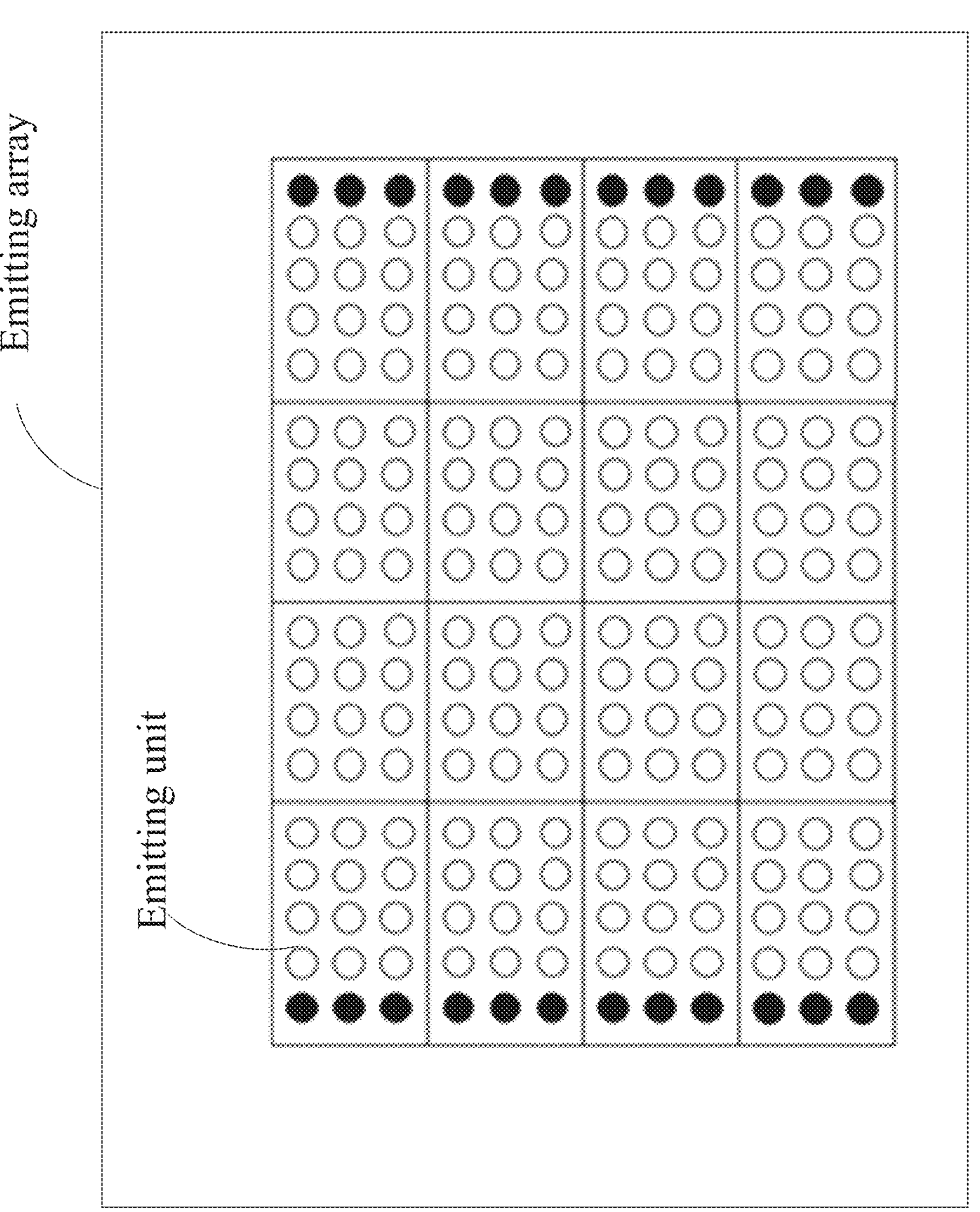
FIG. 10 is an exemplary schematic diagram of an emitting array according to an embodiment of this application.

A manner of increasing the emitting parameter of the emitting unit group corresponding to the edge field of view can be as follows: the light emission power for the edge field of view is increased by increasing the number of lasers emitting in parallel in the emitting unit group corresponding to the edge field of view. FIG. 10 is a schematic diagram of an emitting array (the number of emitting units corresponding to an edge field of view in FIG. 10 is more than the number of lasers corresponding to emitting units of a central field of view), and/or, a light emission power for the edge field of view is increased by adding an emitting pulse sequence within a preset duration of each of the lasers in an emitting unit group corresponding to the edge field of view, and/or, the light emission power for the edge field of view is increased by increasing an emitting power of each of the lasers in the emitting unit group corresponding to the edge field of view.

The number of lasers emitting in parallel in the emitting unit group corresponding to the edge field of view is proportional to the light emission power for the edge field of view. When the number of lasers emitting in parallel in the emitting unit group corresponding to the edge field of view is increased, the light emission power for the edge field of view is increased accordingly.

For example, the current number of lasers emitting in parallel in the emitting unit group corresponding to the edge field of view is as follows: after detection, only when there are 16 lasers emitting in parallel in the emitting unit group corresponding to the edge field of view, if the illuminance corresponding to the edge field of view is consistent with the illuminance corresponding to the central field of view, the number of lasers emitting in parallel in the emitting unit group corresponding to the edge field of view is increased from 12 to 16.

The emitting pulse sequence within the preset duration of each of the lasers in the emitting unit group corresponding to the edge field of view is proportional to the light emission power for the edge field of view. When the emitting pulse sequence within the preset duration of each of the lasers in the emitting unit group corresponding to the edge field of view is increased, the light emission power for the edge field of view is increased accordingly.

Figure 11:
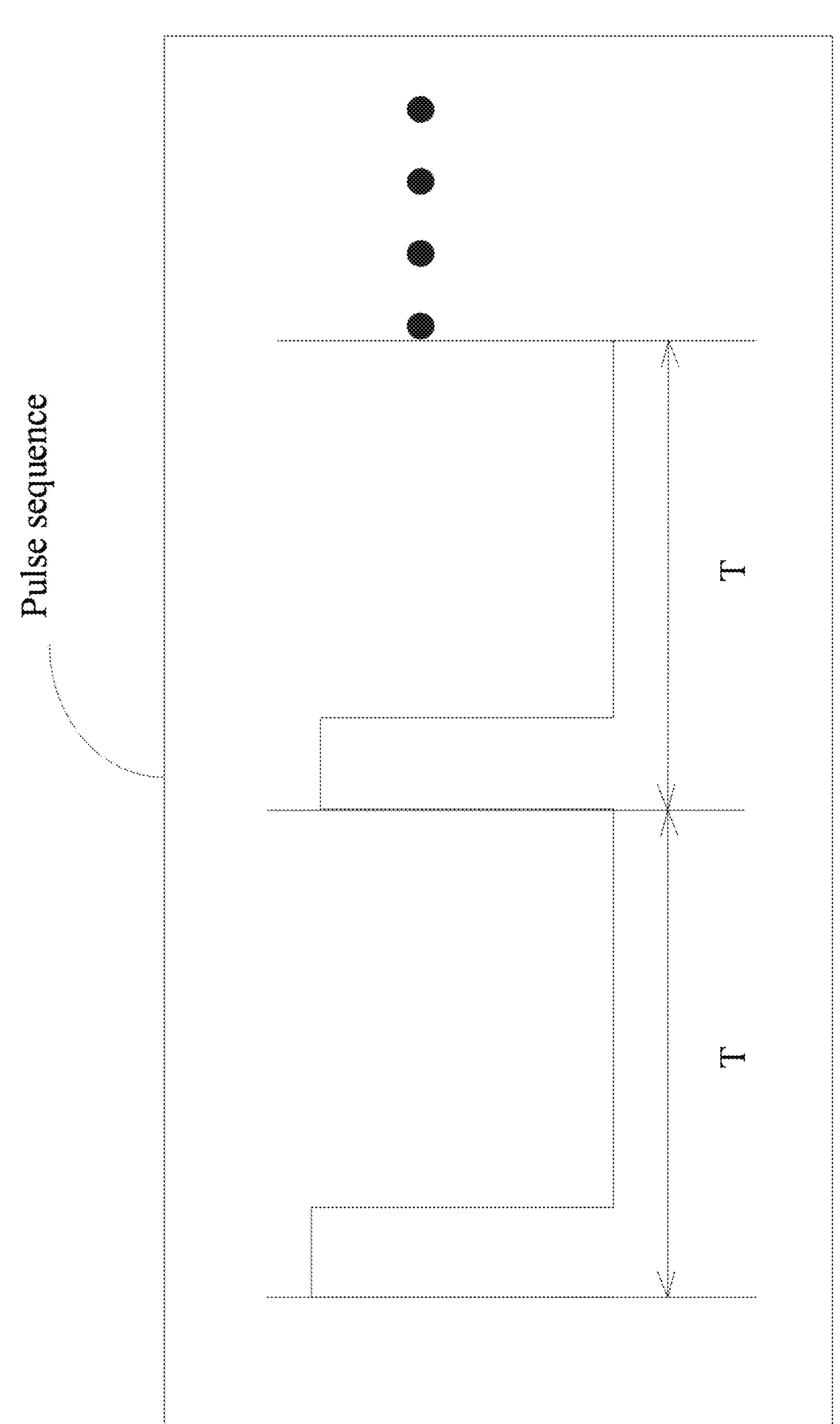
FIG. 11 is an exemplary schematic diagram of a pulse sequence according to an embodiment of this application.
Figure 12:
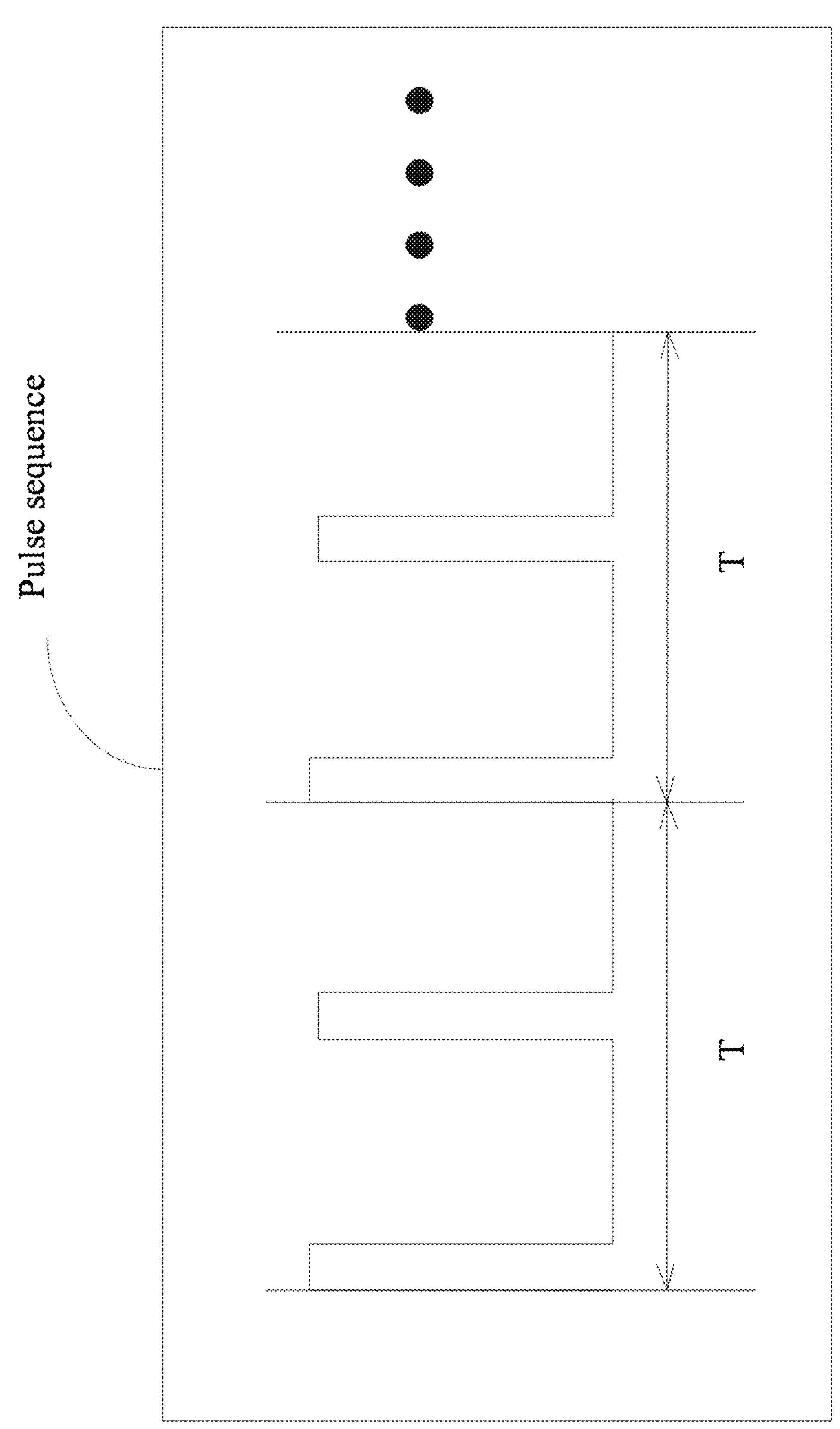
FIG. 12 is an exemplary schematic diagram of a pulse sequence according to an embodiment of this application.

FIG. 11 is a schematic diagram of an emitting pulse sequence per unit time T before the increase. FIG. 12 is a schematic diagram of the emitting pulse sequence per unit time T after the increase. The emitting pulse sequence within the preset duration of each of the lasers in the emitting unit group corresponding to the edge field of view can be increased based on the light emission power for the central field of view, so that the illuminance corresponding to the light emission power for the edge field of view is consistent with the illuminance corresponding to the central field of view, thereby ensuring that a ranging distance of the edge field of view is consistent with a ranging distance of the central field of view.

The emitting power of each of the lasers in the emitting unit group corresponding to the edge field of view is proportional to the light emitting power for the edge field of view. When the emitting power of each of the lasers in the emitting unit group corresponding to the edge field of view is increased, the light emitting power for the edge field of view is increased accordingly.

The emitting power of each of the lasers in the emitting unit group corresponding to the edge field of view can be increased as follows: the current of the edge field of view is increased. Based on the acquired light emission power for the central field of view, a current of the edge field of view is increased so that the light emission power for the edge field of view is consistent with the light emission power for the central field of view. For example, the current of the edge field of view is currently 1.0 A. After detection, when the current of the edge field of view is 1.2 A, the light emission power for the edge field of view is consistent with the light emission power for the central field of view. Therefore, the current of the edge field of view can be increased from 1.0 A to 1.2 A, so that the light emission power for the edge field of view is consistent with the light emission power for the central field of view, and the illuminance of the edge field of view is consistent with an illuminance of the central field of view, thereby ensuring that a ranging distance of the edge field of view is consistent with a ranging distance of the central field of view.

In one emitting unit, the light emission power for the edge field of view can be increased in various ways, including increasing the number of lasers emitting in parallel in the emitting unit group corresponding to the edge field of view, increasing the emitting pulse sequence within the preset duration of each of the lasers in the emitting unit group corresponding to the edge field of view, and increasing the emitting power of each of the lasers in the emitting unit group corresponding to the edge field of view. In some embodiments, based on a difference between the light emission power of the emitting unit group corresponding to the edge field of view and the light emission power of the emitting unit group corresponding to the central field of view, the light emission power for the edge field of view is increased by the combination of increasing the number of lasers emitting in parallel in the emitting unit group corresponding to the edge field of view and by increasing the combined emitted pulse sequence within the preset duration of each of the lasers in the emitting unit group corresponding to the edge field of view.

In some embodiments, based on the difference between the light emission power of the emitting unit group corresponding to the edge field of view and the light emission power of the emitting unit group corresponding to the central field of view, the light emission power for the edge field of view is increased by the combination of increasing the number of lasers emitting in parallel in the emitting unit group corresponding to the edge field of view and by increasing the combined emitting power of each of the lasers in the emitting unit group corresponding to the edge field of view.

In some embodiments, based on the difference between the light emission power of the emitting unit group corresponding to the edge field of view and the light emission power of the emitting unit group corresponding to the central field of view, the light emission power for the edge field of view is increased by the combination of adding the emitting pulse sequence within the preset duration of each of the lasers in the emitting unit group corresponding to the edge field of view and with the manner of increasing the emitting power of each of the lasers in the emitting unit group corresponding to the edge field of view.

In some embodiments, based on the difference between the light emission power of the emitting unit group corresponding to the edge field of view and the light emission power of the emitting unit group corresponding to the central field of view, the light emission power for the edge field of view is increased by the combination of increasing the number of lasers emitting in parallel in the emitting unit group corresponding to the edge field of view, the emitting pulse sequence within the preset duration of each of the lasers in the emitting unit group corresponding to the edge field of view, and the combined emitting power of each of the lasers in the emitting unit group corresponding to the edge field of view.

For example, for the same edge field of view, it may increase the light emission power thereof by increasing the number of lasers emitting in parallel in the corresponding emitting unit group and adding the emitting pulse sequence within the preset duration of each of the lasers in the corresponding emitting unit group. As another example, if the edge field of view is hierarchically partitioned, for different levels of the edge field of view, the light emission power for the corresponding edge field of view can be increased in different ways. For example, as shown in FIG. 6, for the first-level edge field of view, the light emission power is increased by increasing the number of lasers emitting in parallel in the emitting unit group corresponding to the edge field of view. For the second edge field of view, the light emission power is increased by adding the emitting pulse sequence within the preset duration of each of the lasers in the emitting unit group corresponding to the edge field of view.

S205. Detect a target object based on the light emission power for the central field of view and the compensated light emission power for the edge field of view.

See S104, which is not repeated here.

The edge field of view and the central field of view are determined. The light emission power for the edge field of view and the light emission power for the central field of view are acquired. The emitting unit group corresponding to the edge field of view and the emitting unit group corresponding to the central field of view are determined. Based on the difference between the light emission power of the emitting unit group corresponding to the edge field of view and the light emission power of the emitting unit group corresponding to the central field of view, the light emission power for the edge field of view is compensated with the manner of increasing an emitting parameter in the emitting unit group corresponding to the edge field of view. The target object is detected based on the light emission power for the central field of view and the compensated light emission power for the edge field of view. This application can ensure that the illuminance in the edge field of view is consistent with the illuminance in the central field of view, and the ranging distance of the edge field of view is consistent with the ranging distance of the central field of view.

Figure 13:
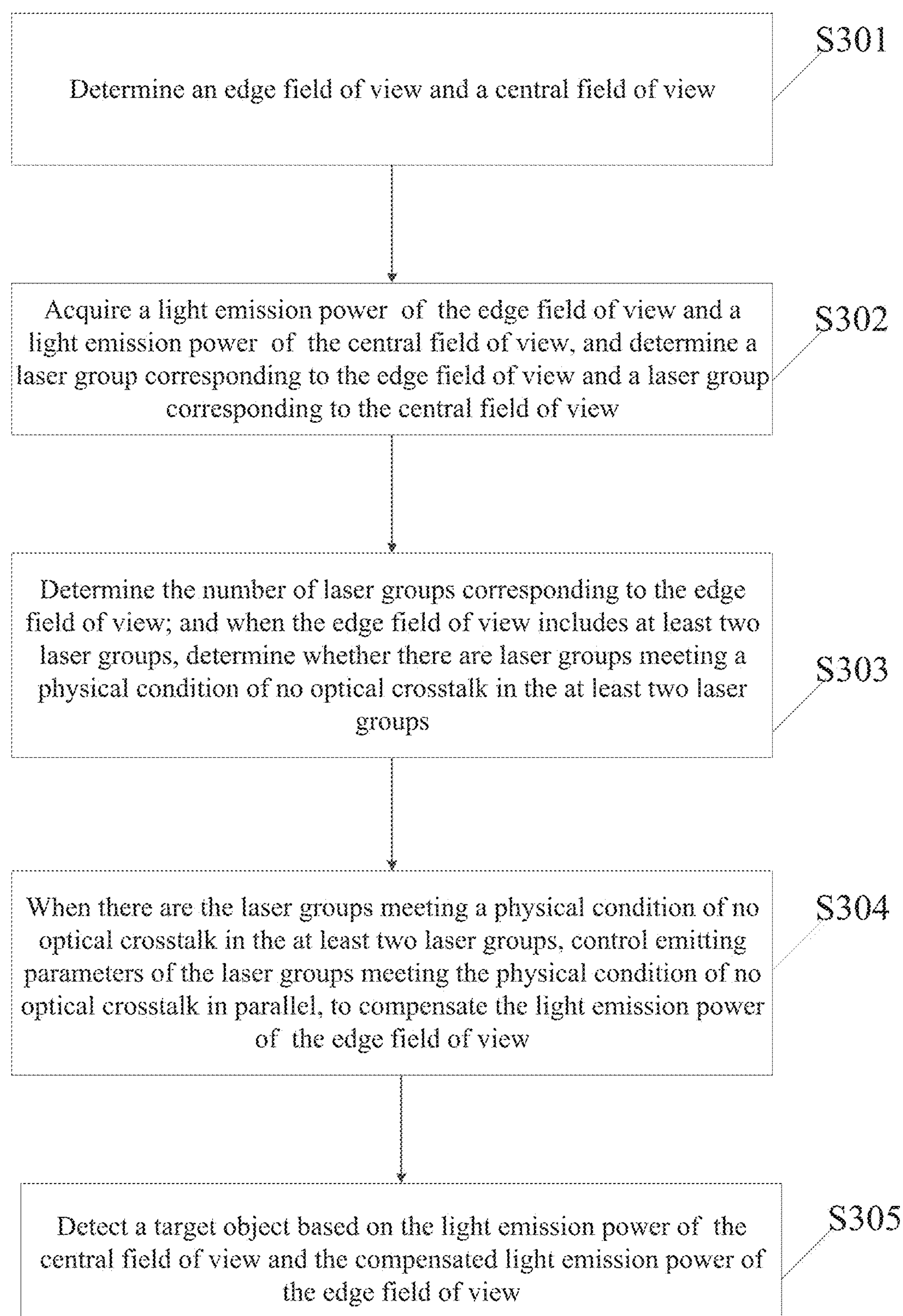
FIG. 13 is a flowchart of a ranging method according to an embodiment of this application.

FIG. 13 is a flowchart of a ranging method according to an embodiment of this application.

After the light emission power for the central field of view and the light emission power for the edge field of view are acquired, the difference between the two is calculated. The difference is the light emission power needed to be increased in the edge field of view. Then, the light emission power for the edge field of view is increased based on an angle of view corresponding to the edge field of view and the difference and with a specific manner of increasing the light emission power for the edge field of view. The method may include the following operations.

S301. Determine the edge field of view and the central field of view.

See S101, which is not repeated here.

S302. Acquire the light emission power for the edge field of view and the light emission power for the central field of view, and determine an emitting unit group corresponding to the edge field of view and an emitting unit group corresponding to the central field of view.

See S102, which is not repeated here.

S303. Determine the number of the emitting unit groups corresponding to the edge field of view, and determine whether there are the emitting units meeting a physical condition of no optical crosstalk in at least two emitting unit groups when the edge field of view includes the at least two emitting unit groups.

There can be a plurality of emitting unit groups corresponding to the edge field of view. After lasers of one emitting unit group emit laser beams, all the reflected laser beams should be received by corresponding laser receivers. However, due to the optical features of the laser lens, part of the reflected laser beams are received by non-corresponding laser receivers, resulting in optical crosstalk. Therefore, when the edge field of view includes at least two emitting unit groups, it is necessary to determine whether there are emitting unit groups meeting the physical condition of no optical crosstalk.

S304. When there are emitting unit groups meeting a physical condition of no optical crosstalk in the at least two emitting unit groups, parallelly control emitting parameters of the emitting unit groups meeting the physical condition of no optical crosstalk, to compensate the light emission power for the edge field of view.

A manner for controlling the emitting parameter of the emitting unit groups meeting the physical condition of no optical crosstalk to compensate the light emission power for the edge field of view can be as follows: acquiring the difference between the light emission power of the emitting unit group corresponding to the edge field of view and the light emission power of the emitting unit group corresponding to the central field of view, acquiring an angle of view of the edge field of view, and based on the difference and the angle of view, controlling the emitting parameter of the emitting unit group corresponding to the edge field of view to compensate the light emission power for the edge field of view.

The angle of view of the edge field of view is as follows: in an entire field of view of one emitting unit, for the angle of the field of view corresponding to the edge field of view, according to different division manners of the edge field of view, the angles of the field of view corresponding to the edge field of view are different. For example, the angle of view of the entire field of view is 120 degrees. The angle of view of the middle 60 degrees is the angle of view corresponding to the central field of view. The angles of the field of view of 30 degrees on the left side or right side are the angle of view corresponding to the edge field of view. If the edge field of view is partitioned as a first-level edge field of view and a second-level edge field of view, the angle of view corresponding to the first-level edge field of view in the edge field of view on the left can be 0 to 15 degrees from the left. The angle of view corresponding to the second-level edge field of view can be 15 to 30 degrees from the left.

In some embodiments, for the edge field of view that is not hierarchically partitioned, the light emission power for the edge field is increased in various ways, including increasing the laser emitting in parallel in the emitting unit group corresponding to the edge field of view, increasing the emitting pulse sequence within the preset duration of each of the lasers in the emitting unit group corresponding to the edge field of view, and increasing the emitting power of each of the lasers in the emitting unit group corresponding to the edge field of view. The difference between the light emission power of the emitting unit group corresponding to the edge field of view and the light emission power of the emitting unit group corresponding to the central field of view can be determined. The angle of view of the edge field of view can be acquired. Based on the difference and the angle of view, the emitting parameters of the emitting unit group corresponding to the edge field of view are controlled to compensate the light emission power for the edge field of view.

The difference between the light emission power of the emitting unit group corresponding to the edge field of view and the light emission power of the emitting unit group corresponding to the central field of view is determined. The light emission power required to be compensated in the edge field of view can be obtained. Based on the difference between the light emission power of the emitting unit group corresponding to the edge field of view and the light emission power of the emitting unit group corresponding to the central field of view and the angle of view of the edge field of view, the number of lasers emitting in parallel corresponding to the compensated output light power required to be compensated in the edge field of view is calculated. The number of lasers emitting in parallel in the corresponding emitting unit group is added with the number of lasers emitting in parallel in the emitting unit group corresponding to the light emission power required to be compensated. The number of lasers emitting in parallel in the corresponding emitting unit group is obtained. In a calibrated random access memory of a field programmable gate array of the LiDAR, the number of lasers emitting in parallel in the emitting unit group corresponding to the edge field of view is corrected as the number of lasers emitting in parallel in the corresponding emitting unit group after the edge field of view is corrected.

The difference between the light emission power of the emitting unit group corresponding to the edge field of view and the light emission power of the emitting unit group corresponding to the central field of view can also be determined. The angle of view of the edge field of view is acquired. Based on the difference and the angle of view, the emitting pulse sequence within the preset duration of each of the lasers in the emitting unit group corresponding to the edge field of view is increased to increase the light emission power for the edge field of view.

The difference between the light emission power of the emitting unit group corresponding to the edge field of view and the light emission power of the emitting unit group corresponding to the central field of view is determined. The light emission power required to be compensated in the edge field of view can be obtained. Based on the difference between the light emission power of the emitting unit group corresponding to the edge field of view and the light emission power of the emitting unit group corresponding to the central field of view and the angle of view, the emitting pulse sequence required to be increased in the preset duration of each of the lasers in the emitting unit group corresponding to the edge field of view is calculated. The number of emitting pulse sequences within the preset duration in the emitting unit group corresponding to the current edge field of view is added with the emitting pulse sequence to be increased to obtain the increased emitting pulse sequence within the preset duration of each of the lasers. In the calibrated random access memory of the field programmable gate array of the LiDAR, the emitting pulse sequence within the preset duration of each of the lasers is corrected as the increased emitting pulse sequence within the preset duration of each of the lasers.

The difference between the light emission power of the emitting unit group corresponding to the edge field of view and the light emission power of the emitting unit group corresponding to the central field of view is determined. The angle of view of the edge field of view is acquired. Based on the difference and the angle of view, the emitting power of each of the lasers in the emitting unit group corresponding to the edge field of view is increased to increase the light emission power for the edge field of view.

The difference between the light emission power of the emitting unit group corresponding to the edge field of view and the light emission power of the emitting unit group corresponding to the central field of view is determined. The light emission power required to be compensated in the edge field of view can be obtained. Then, based on the difference between the light emission power of the emitting unit group corresponding to the edge field of view and the light emission power of the emitting unit group corresponding to the central field of view and the angle of view, the emitting power required to be increased in each of the emitting unit groups corresponding to the edge field of view is calculated. The increase in emitting power of each of the lasers can be realized by increasing the driving current of each of the lasers. Therefore, it is possible to calculate the driving current that needs to be increased for each of the lasers in the corresponding emitting unit group. A current driving current is added with the driving current required to be increased in the edge field of view to obtain the increased driving current of each of the lasers in the corresponding emitting unit group. In the calibrated random access memory of the field programmable gate array of the LiDAR, the current driving current of each of the lasers in the corresponding emitting unit group is corrected as the increased driving current of each of the lasers in the corresponding emitting unit group.

In some embodiments, if the edge field of view is hierarchically partitioned, as shown in FIG. 6, compensation for a light emission power for the first-level edge field of view can be as follows: determining the difference between the light emission power of the emitting unit group corresponding to the first-level edge field of view and the light emission power of the emitting unit group corresponding to the central field of view to obtain the light emission power required to be increased in the emitting unit group corresponding to the first-level edge field of view; then, calculating a value required to be increased based on one or more of manners, including increasing the number of lasers emitting in parallel, increasing the emitted pulse sequence within the preset duration of each of the lasers, and increasing the emitted power in the emitting unit group corresponding to the first-level edge field of view. If the light emission power for the first-level edge field of view is increased by the combination of increasing the number of lasers emitting in parallel in the emitting unit group corresponding to the first-level edge field of view and the combined emitted pulse sequence within the preset duration of each of the lasers, calculating the number of lasers emitting in parallel required to be increased in the emitting unit group corresponding to the first-level edge field of view, and the emitting pulse sequence required to be increased within the preset duration of each the lasers in the emitting unit group corresponding to the first-level edge field of view. For example, it is possible to increase the number of lasers emitting in parallel in the emitting unit group corresponding to the first-level edge field of view so that a difference between the light emission power for the first-level edge field of view and the light emission power for the central field of view to one-half of a difference for the increased light emission power. Meanwhile, a difference between the light emission power for the first-level edge field of view and the light emission power for the central field of view is set to zero by adding the emitting pulse sequence within the preset duration of each of the lasers in the emitting unit group corresponding to the first-level edge field of view. For example, before the light emission power is not increased, if the difference between the light emission power for the first-level edge field of view and the light emission power for the central field of view is 100 W, after the number of lasers emitting in parallel in the emitting unit group corresponding to the first-level edge field of view is increased, the difference between the light emission power for the first-level edge field of view and the light emission power for the central field of view is made to be 50 W. At the same time, the emitting pulse sequence within the preset duration of each of the lasers in the emitting unit group corresponding to the first-level edge field of view is increased, so that the difference between the light emitting power for the first-level edge field of view and the light emitting power for the central field of view is OW. The compensation for the light emitting power for the first-level edge field of view is completed. Similarly, for the second-level edge field of view, the light emission power can be increased in the same manner until the light emission power for all the edge fields of view is consistent with the light emission power for the central field of view. A sequence of execution in the combined manner is not specifically limited.

S304. Detect a target object based on the light emission power for the central field of view and the compensated light emission power for the edge field of view.

See S104, which is not repeated here.

The edge field of view and the central field of view are determined. The light emission power for the edge field of view and the light emission power for the central field of view are acquired. The emitting unit group corresponding to the edge field of view and the emitting unit group corresponding to the central field of view are determined. The number of emitting unit groups corresponding to the edge field of view is determined. When the edge field of view includes at least two emitting unit groups, determine whether there are emitting unit groups meeting a physical condition of no optical crosstalk in the at least two emitting unit groups. When there are the emitting unit groups meeting the physical condition of no optical crosstalk in the at least two emitting unit groups, the light emission power for the edge field of view is compensated by controlling the emitting parameter of the emitting unit groups meeting the physical condition of no optical crosstalk in parallel. The target object is detected based on the light emission power for the central field of view and the compensated light emission power for the edge field of view. The light emission power corresponding to the edge field of view is compensated when it is determined that the physical optical non-crosstalk is met, so as to avoid that the non-corresponding laser receiver is interfered by the laser corresponding to the edge field of view after the light emission power corresponding to the edge field of view is compensated. This application can ensure that the illuminance in the edge field of view is consistent with the illuminance in the central field of view, and the ranging distance of the edge field of view is consistent with the ranging distance of the central field of view.

The following is related to a device of this application, which can be used to execute the method of this application. For details not disclosed in the device embodiment of this application, please refer to the method embodiment of this application.

Figure 14:
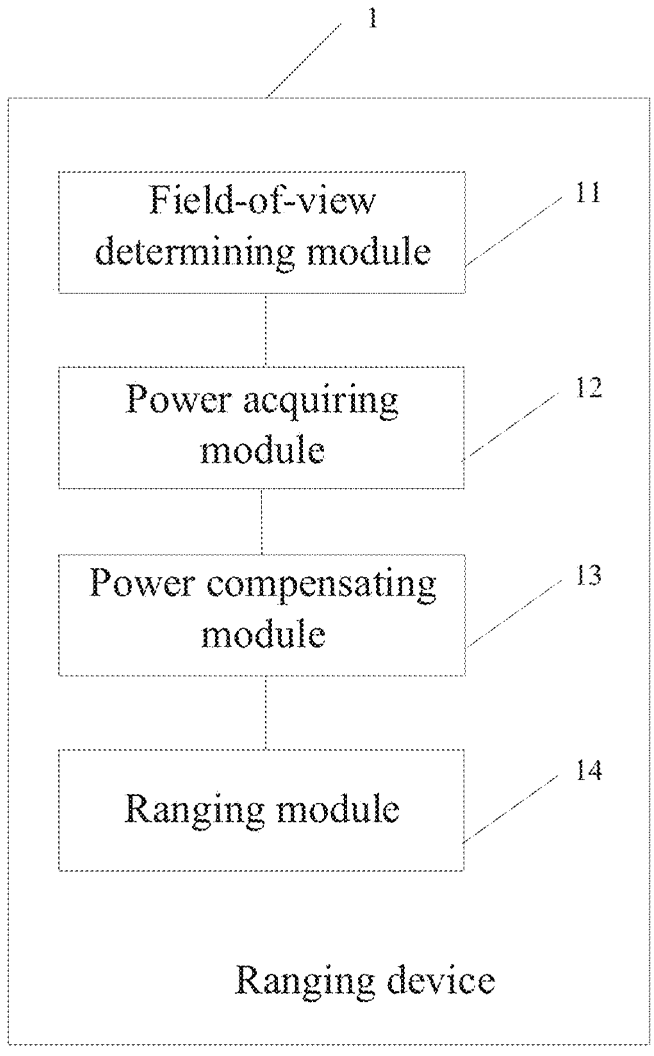
FIG. 14 is a schematic structural diagram of a ranging device according to an embodiment of this application.

FIG. 14 shows a schematic structural diagram of a ranging device according to an exemplary embodiment of this application. The ranging device can be realized as an entire or a part of a terminal by software, hardware, or a combination of both. The device 1 includes a field-of-view determining module 11, a power acquiring module 12, a power compensating module 13, and a ranging module 14.

The field-of-view determining module 11, configured to determine an edge field of view and a central field of view.

The power acquiring module 12, configured to acquire a light emission power for the edge field of view and a light emission power for the central field of view.

The power compensating module 13, configured to compensate the light emission power for the edge field of view based on a difference between the light emission power for the edge field of view and the light emission power for the central field of view.

The ranging module 14, configured to detect the target object based on the light emission power for the central field of view and the compensated light emission power for the edge field of view.

The device 1 may further include:

an emitting unit group determining module 15, configured to determine an emitting unit group corresponding to the edge field of view and an emitting unit group corresponding to the central field of view.

The power compensating module 13 further includes:

a difference acquiring unit 131, configured to acquire a difference between a light emission power of the emitting unit group corresponding to the edge field of view and a light emission power of the emitting unit group corresponding to the central field of view;

a power compensation unit 132, configured to control an emitting parameter of the emitting unit group corresponding to the edge field of view to compensate the light emission power for the edge field of view based on a difference between the light emission power of the emitting unit group corresponding to the edge field of view and the light emission power for the emitting unit group corresponding to the central field of view.

In some embodiments, the power compensating unit 132 is configured to:

increase the light emission power for the edge field of view by increasing the number of lasers emitted in parallel in the emitting unit group corresponding to the edge field of view based on the difference between the light emission power of the emitting unit group corresponding to the edge field of view and the light emission power of the emitting unit group corresponding to the central field of view.

In some embodiments, the power compensating unit 132 is configured to:

increase the light emission power for the edge field of view by adding an emitting pulse sequence within a preset duration of each of the lasers in the emitting unit group corresponding to the edge field of view based on the difference between the light emission power of the emitting unit group corresponding to the edge field of view and the light emission power of the emitting unit group corresponding to the central field of view.

In some embodiments, the power compensating unit 132 is configured to:

increase the light emission power for the edge field of view by increasing the emitting power of each of the lasers in the emitting unit group corresponding to the edge field of view based on the difference between the light emission power of the emitting unit group corresponding to the edge field of view and the light emission power of the emitting unit group corresponding to the central field of view.

Figure 15:
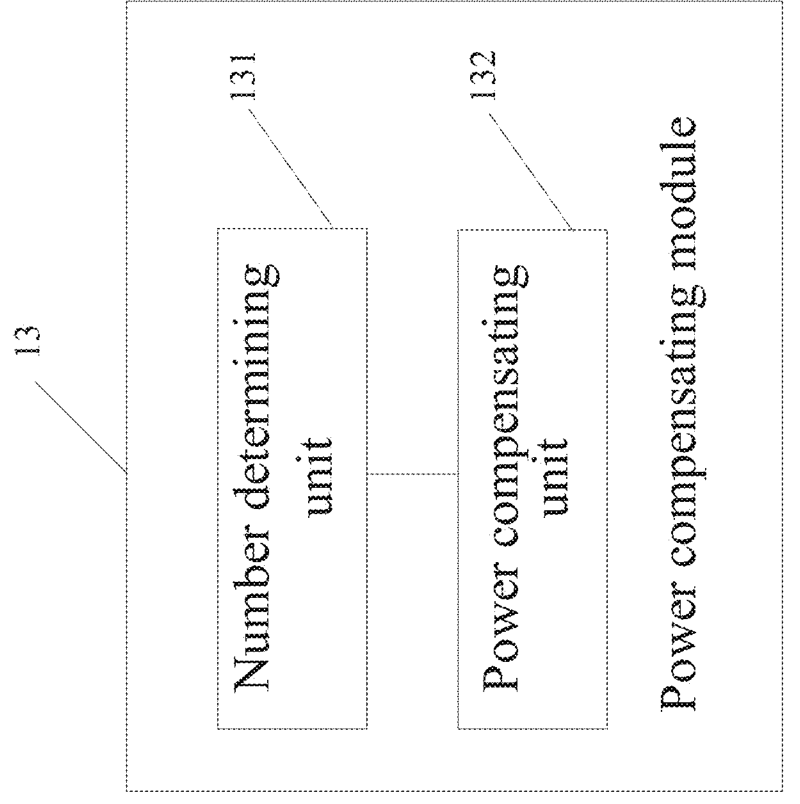
FIG. 15 is a schematic structural diagram of a power compensating module according to an embodiment of this application.

In some embodiments, as shown in FIG. 15, the power compensating module 13 further includes:

a number determining unit 131, configured to determine the number of the emitting unit groups corresponding to the edge field of view; and determine whether there are the emitting unit groups meeting a physical condition of no optical crosstalk in at least two emitting unit groups when the edge field of view includes the at least two emitting unit groups;

the power compensating unit 132, further configured to compensate the light emission power for the edge field of view by controlling emitting parameters of the emitting unit groups meeting the physical condition of no optical crosstalk in parallel when there are the emitting unit groups meeting the physical condition of no optical crosstalk in the at least two emitting unit groups.

In some embodiments, the device 1 further includes:

a partitioning module 16, configured to partition the edge field of view according to an angle of view corresponding to the edge field of view;

a difference calculation module 17, configured to calculate differences between the light emission power for partitions of the edge field of view respectively and the light emission power for the central field of view; and the power compensation unit 132, further configured to compensate the light emission power for the edge field of view according to the differences between the light emission power for the partitions of the edge field of view respectively and the light emission power for the central field of view.

In some embodiments, the light emission power corresponding to the edge field of view is compensated when it is determined that the physical optical non-crosstalk is met, so that avoiding the non-corresponding laser receiver is interfered by the laser corresponding to the edge field of view after the light emission power corresponding to the edge field of view is compensated. It is ensured that the illuminance in the edge field of view is consistent with the illuminance in the central field of view, and the ranging distance of the edge field of view is consistent with the ranging distance of the central field of view.

It should be noted that when the ranging device executes a ranging method, only a division of the above functional modules is given as an example. In practical applications, the above functional allocation can be completed by different functional modules according to needs. That is, an internal structure of the apparatus is divided into different functional modules to complete an entire or a part of the functions described above. In addition, the ranging device described in the above embodiments belongs to the same concept as the ranging method embodiments. A realization process thereof is detailed in method embodiments, which are not described here.

The serial numbers in embodiments of this application are for description only and do not represent the advantages and disadvantages of the embodiments.

Embodiments of this application also provide a computer storage medium. The computer storage medium can store a plurality of instructions. The instructions are adapted to be loaded by a processor and execute the steps of the method in the embodiments shown in FIG. 1 to FIG. 13 above. For a execution process, please refer to the description of the embodiments shown in FIG. 1 to FIG. 13, which is not repeated here.

This application also provides a LiDAR. The LiDAR is stored with at least one instruction. The at least one instruction is loaded by a processor and executes the steps of a method in the above embodiments shown in FIG. 1 to FIG.

13. A execution process can refer to the description of the embodiments shown in FIG. 1 to FIG. 13, which is not described here.

Figure 16:
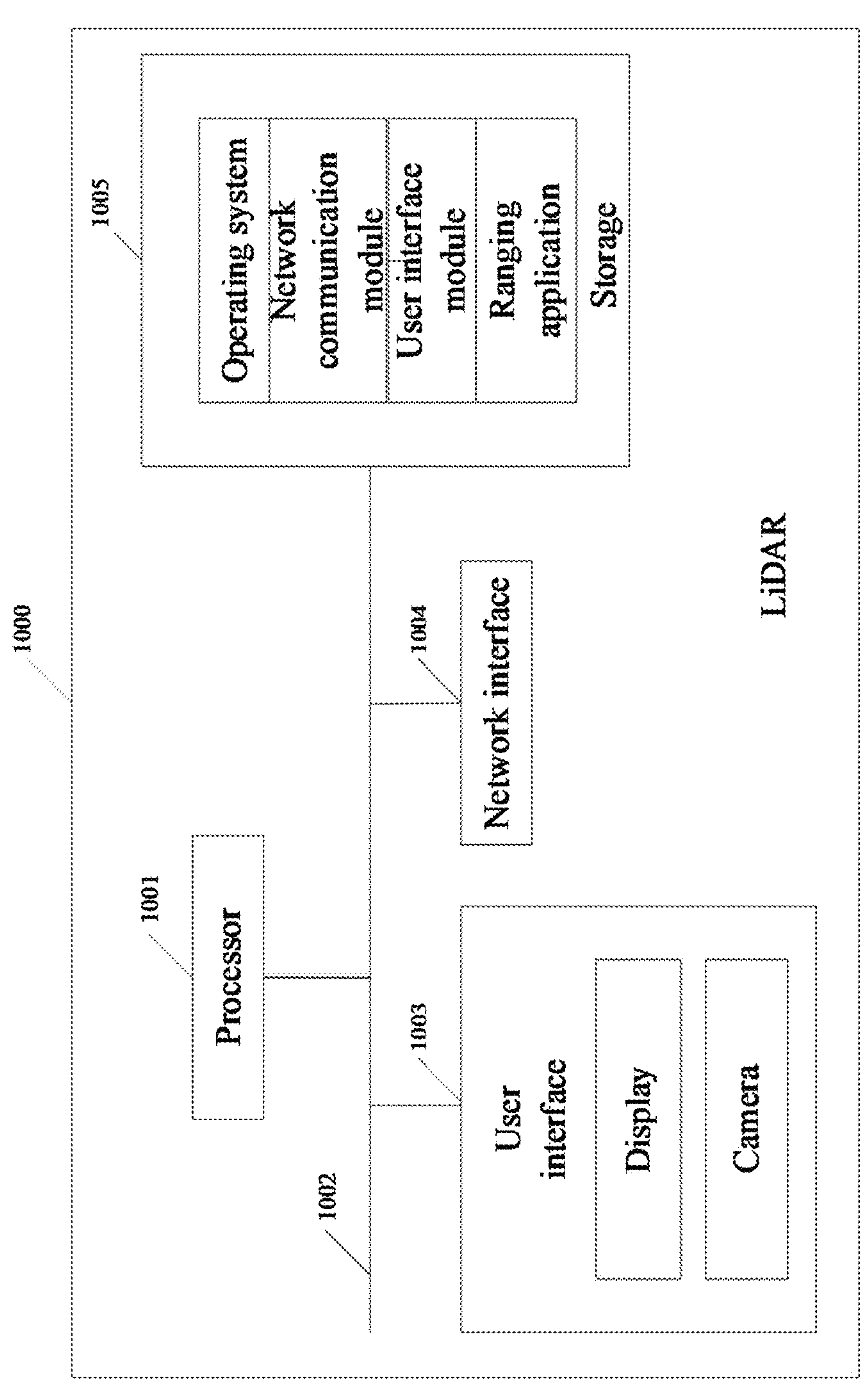
FIG. 16 is a schematic structural diagram of a LiDAR according to an embodiment of this application.

FIG. 16 is a structural diagram of an electronic apparatus according to some embodiments of this application. As shown in FIG. 15, a mobile terminal 1000 can include at least one processor 1001, at least one network interface 1004, a user interface 1003, a storage 1005, and at least one communication bus 1002.

The communication bus 1002 is configured to realize connection communication between these assemblies.

The user interface 1003 can include a display and a camera. In some embodiments, the user interface 1003 can include a standard wired interface and a wireless interface.

The network interface 1004 can include a standard wired interface or a wireless interface (e.g. a WI-FI interface).

The processor 1001 can include one or more processing cores. The processor 1001 connects various parts within the entire electronic apparatus 1000 using various interfaces and lines, as well as performs various functions of the electronic device 1000 and processes data by operating or executing instructions, programs, code sets, or instruction sets stored in the storage 1005, and invoking data stored in the storage 1005. In some embodiments, the processor 1001 can be implemented in at least one hardware form of Digital Signal Processing (DSP), Field-Programmable Gate Array (FPGA), and Programmable Logic Array (PLA). The processor 1001 can integrate one or a combination of a plurality of a central processing unit (CPU), a graphics processing unit (GPU), a modem, and the like. The CPU mainly deals with an operating system, the user interface, and the application program. The GPU is configured to render and draw contents that a display screen needs to display. The modem is configured to handle wireless communication. It can be understood that the modem described above also cannot be integrated into the processor 1001 and be implemented by a single chip.

The storage 1005 can include a random access memory (RAM), or can include a read-only memory (ROM). In some embodiments, the storage 1005 includes a non-transitory computer-readable storage medium. The storage 1005 can be configured to store the instructions, the program, the codes, the code sets, or the instruction sets. The storage 1005 can include a storage program area and a storage data region. The stored program region can store instructions for implementing the operating system, the instructions for implementing at least one function (such as a touch function, a sound playback function, an image playback function, etc.), instructions for implementing the various method embodiments described above, and the like. The storage data region can store data and the like involved in the above various method embodiments. The storage 1005 can also be at least one storage device located remotely from the above processor 1001. As shown in FIG. 15, the storage 1005 as a computer storage medium can include an operating system, a network communication module, a user interface module, and a ranging application.

In the mobile terminal 1000 shown in FIG. 16, the user interface 1003 is mainly configured to provide an input interface for a user to acquire data input by the user. The processor 1001 can be configured to invoke the generated ranging application stored in the storage 1005 and perform the following operations:

determining an edge field of view and a central field of view;

acquiring a light emission power for the edge field of view and a light emission power for the central field of view;

compensating the light emission power for the edge field of view based on a difference between the light emission power for the edge field of view and the light emission power for the central field of view; and detecting a target object based on the light emission power for the central field of view and the compensated light emission power for the edge field of view.

In some embodiments, before compensating the light emission power for the edge field of view based on a difference between the light emission power for the edge field of view and the light emission power for the central field of view, the processor 1001 also performs the following operations:

when compensating the light emission power for the edge field of view based on a difference between the light emission power for the edge field of view and the light emission power for the central field of view to determine an emitting unit group corresponding to the edge field of view and an emitting unit group corresponding to the central field of view, the following operations are performed.

acquiring a difference between a light emission power of the emitting unit group corresponding to the edge field of view and a light emission power of the emitting unit group corresponding to the central field of view; and controlling an emitting parameter of the emitting unit group corresponding to the edge field of view to compensate the light emission power for the edge field of view based on the difference between the light emission power of the emitting unit group corresponding to the edge field of view and the light emission power of the emitting unit group corresponding to the central field of view.

When controlling the emitting parameter of the emitting unit group corresponding to the edge field of view to compensate the light emission power for the edge field of view based on the difference between the light emission power of the emitting unit group corresponding to the edge field of view and the light emission power of the emitting unit group corresponding to the central field of view, the processor 1001 performs following operations:

increasing the light emission power for the edge field of view by increasing the number of lasers emitting in parallel in the emitting unit group corresponding to the edge field of view based on the difference between the light emission power of the emitting unit group corresponding to the edge field of view and the light emission power of the emitting unit group corresponding to the central field of view.

In some embodiments, when controlling the emitting parameter of the emitting unit group corresponding to the edge field of view to compensate the light emission power for the edge field of view based on the difference between the light emission power of the emitting unit group corresponding to the edge field of view and the light emission power of the emitting unit group corresponding to the central field of view, the processor 1001 performs the following operations:

increasing the light emission power for the edge field of view by adding an emitting pulse sequence within a preset duration of each of the lasers in the emitting unit group corresponding to the edge field of view based on the difference between the light emission power of the emitting unit group corresponding to the edge field of view and the light emission power of the emitting unit group corresponding to the central field of view.

In some embodiments, when controlling the emitting parameter of the emitting unit group corresponding to the edge field of view to compensate the light emission power for the edge field of view based on the difference between the light emission power of the emitting unit group corresponding to the edge field of view and the light emission power of the emitting unit group corresponding to the central field of view, the processor 1001 performs the following operations:

increasing the light emission power for the edge field of view by increasing an emitting power of each of the lasers in the emitting unit group corresponding to the edge field of view based on the difference between the light emission power of the emitting unit group corresponding to the edge field of view and the light emission power of the emitting unit group corresponding to the central field of view.

In some embodiments, before controlling the emitting parameter of the emitting unit group corresponding to the edge field of view to compensate the light emission power for the edge field of view based on the difference between the light emission power of the emitting unit group corresponding to the edge field of view and the light emission power of the emitting unit group corresponding to the central field of view, the processor 1001 further performs the following operations:

determining the number of the emitting unit groups corresponding to the edge field of view; determining whether there are the emitting unit groups meeting a physical condition of no optical crosstalk in at least two emitting unit groups when the edge field of view comprises the at least two emitting unit groups; and compensating the light emission power for the edge field of view by controlling the emitting parameter of the emitting unit groups meeting the physical condition of no optical crosstalk in parallel when there are the emitting unit groups meeting the physical condition of no optical crosstalk in the at least two emitting unit groups.

In some embodiments, before compensating the light emission power for the edge field of view based on the difference between the light emission power for the edge field of view and the light emission power for the central field of view, the processor 1001 also performs the following operations:

partitioning the edge field of view according to an angle of view corresponding to the edge field of view;

calculating differences between light emission powers for partitions of the edge field of view respectively and the light emission power for the central field of view; and compensating the light emission power for the edge field of view according to the differences between the light emission powers for the partitions of the edge field of view respectively and the light emission power for the central field of view.

In some embodiments, the light emission power corresponding to the edge field of view is compensated when it is determined that the physically optical non-crosstalk is met, so that avoiding the non-corresponding laser receiver is interfered by the laser corresponding to the edge field of view after the light emission power corresponding to the edge field of view is compensated. It is ensured that the illuminance in the edge field of view is consistent with the illuminance in the central field of view, and the ranging distance of the edge field of view is consistent with the ranging distance of the central field of view.

The person skilled in the art can understand that all or part of procedures in methods of the forgoing embodiments can be implemented by instructing a relevant hardware via computer program. The program can be stored in a computer readable storage medium. During execution, the computer program can include the procedures of the embodiments of the forgoing methods. A storage medium can be a magnetic disk, an optical disc, the read-only storage memory, the random storage memory, and so on.

The disclosed forgoing are only embodiments of this application, which cannot be used to limit the scope of rights of this application. Therefore, equivalent changes made in accordance with the claims of this application still fall within the scope of the application.

What is claimed is:

1. A ranging method, applied to a LiDAR, comprising:

determining an edge field of view and a central field of view;

acquiring a light emission power for the edge field of view and a light emission power for the central field of view;

compensating the light emission power for the edge field of view based on a difference between the light emission power for the edge field of view and the light emission power for the central field of view, wherein the light emission power for the central field of view is consistent with the compensated light emission power for the edge field of view; and detecting a target object based on the light emission power for the central field of view and the compensated light emission power for the edge field of view.

2. The method according to claim 1, wherein, before compensating the light emission power for the edge field of view based on the difference between the light emission power for the edge field of view and the light emission power for the central field of view, the method further comprises:

determining an emitting unit group corresponding to the edge field of view and an emitting unit group corresponding to the central field of view, wherein compensating the light emission power for the edge field of view based on the difference between the light emission power for the edge field of view and the light emission power for the central field of view comprises:

acquiring a difference between a light emission power of the emitting unit group corresponding to the edge field of view and a light emission power of the emitting unit group corresponding to the central field of view; and controlling an emitting parameter of the emitting unit group corresponding to the edge field of view to compensate the light emission power for the edge field of view based on the difference between the light emission power of the emitting unit group corresponding to the edge field of view and the light emission power of the emitting unit group corresponding to the central field of view.

3. The method according to claim 2, wherein controlling the emitting parameter of the emitting unit group corresponding to the edge field of view to compensate the light emission power for the edge field of view based on the difference between the light emission power of the emitting unit group corresponding to the edge field of view and the light emission power of the emitting unit group corresponding to the central field of view comprises:

increasing the light emission power for the edge field of view by increasing the number of lasers emitting in parallel in the emitting unit group corresponding to the edge field of view based on the difference between the light emission power of the emitting unit group corresponding to the edge field of view and the light emission power of the emitting unit group corresponding to the central field of view.

4. The method according to claim 2, wherein controlling the emitting parameter of the emitting unit group corresponding to the edge field of view to compensate the light emission power for the edge field of view based on the difference between the light emission power of the emitting unit group corresponding to the edge field of view and the light emission power of the emitting unit group corresponding to the central field of view comprises:

increasing the light emission power for the edge field of view by adding an emitting pulse sequence within a preset duration of each of the lasers in the emitting unit group corresponding to the edge field of view based on the difference between the light emission power of the emitting unit group corresponding to the edge field of view and the light emission power of the emitting unit group corresponding to the central field of view.

5. The method according to claim 2, wherein controlling the emitting parameter of the emitting unit group corresponding to the edge field of view to compensate the light emission power for the edge field of view based on the difference between the light emission power of the emitting unit group corresponding to the edge field of view and the light emission power of the emitting unit group corresponding to the central field of view comprises:

increasing the light emission power for the edge field of view by increasing emitting power of each of the lasers in the emitting unit group corresponding to the edge field of view based on the difference between the light emission power of the emitting unit group corresponding to the edge field of view and the light emission power of the emitting unit group corresponding to the central field of view.

6. The method according to claim 2, wherein, before controlling the emitting parameter of the emitting unit group corresponding to the edge field of view to compensate the light emission power for the edge field of view based on the difference between the light emission power of the emitting unit group corresponding to the edge field of view and the light emission power of the emitting unit group corresponding to the central field of view, the method further comprises:

determining a number of emitting unit groups corresponding to the edge field of view, and when at least two emitting unit groups are determined to correspond to the edge field of view, determining whether the at least two emitting unit groups meets a physical condition of no optical crosstalk; and when the at least two emitting unit groups comprise emitting unit groups meeting the physical condition of no optical crosstalk, compensating the light emission power for the edge field of view by controlling in parallel emitting parameters of the emitting unit groups meeting the physical condition of no optical crosstalk.

7. The method according to claim 1, wherein, before compensating the light emission power for the edge field of view based on the difference between the light emission power for the edge field of view and the light emission power for the central field of view, the method further comprises:

partitioning the edge field of view according to an angle of view corresponding to the edge field of view;

calculating differences between light emission power for partitions of the edge field of view and the light emission power for the central field of view respectively; and compensating the light emission power for the edge field of view according to the differences between the light emission power for the partitions of the edge field of view and the light emission power for the central field of view.

8. A non-transitory computer storage medium, wherein the non-transitory computer storage medium stores a plurality of instructions, and the plurality of instructions are capable of being loaded by a processor to perform the method according to claim 1.

9. A ranging device for a LiDAR, comprising:

a field-of-view determining module, configured to determine an edge field of view and a central field of view;

a power acquiring module, configured to acquire a light emission power for the edge field of view and a light emission power for the central field of view;

a power compensating module, configured to compensate the light emission power for the edge field of view based on a difference between the light emission power for the edge field of view and the light emission power for the central field of view, wherein the light emission power for the central field of view is consistent with the compensated light emission power for the edge field of view; and a ranging module, configured to detect a target object based on the light emission power for the central field of view and the compensated light emission power for the edge field of view.

* * * * *